(12) United States Patent
Li et al.

(10) Patent No.: US 8,947,619 B2
(45) Date of Patent: Feb. 3, 2015

(54) PHOTOLUMINESCENCE COLOR DISPLAY COMPRISING QUANTUM DOTS MATERIAL AND A WAVELENGTH SELECTIVE FILTER THAT ALLOWS PASSAGE OF EXCITATION RADIATION AND PREVENTS PASSAGE OF LIGHT GENERATED BY PHOTOLUMINESCENCE MATERIALS

(75) Inventors: Yi-Qun Li, Danville, CA (US); Yi Dong, Tracy, CA (US); Wei Shan, Fremont, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 13/403,854

(22) Filed: Feb. 23, 2012

(65) Prior Publication Data

US 2012/0287381 A1   Nov. 15, 2012

Related U.S. Application Data

(63) Continuation-in-part of application No. 11/824,979, filed on Jul. 3, 2007, now abandoned.

(60) Provisional application No. 60/819,420, filed on Jul. 6, 2006.

(51) Int. Cl.
*G02F 1/1335* (2006.01)
*H01J 29/10* (2006.01)

(52) U.S. Cl.
CPC ............... *G02F 1/133617* (2013.01); *G02F 2001/133567* (2013.01); *G02F 2001/133614* (2013.01); *G02F 2203/34* (2013.01)
USPC .......................................... 349/106; 313/467

(58) Field of Classification Search
CPC ............... G02F 1/133617; G02F 1/133621; G02F 2001/133614; G02F 1/133516; H01J 29/20; H01J 29/187; H01J 29/24; C09K 11/7774; C03C 4/12
USPC ............................ 349/71, 106; 313/467–469
See application file for complete search history.

(56) References Cited

U.S. PATENT DOCUMENTS 3,290,255 A   12/1966   Smith
3,593,055 A   7/1971   Geusic et al.
(Continued)

FOREIGN PATENT DOCUMENTS

EP   647694   4/1995
EP   1 256 835 A   11/2002
(Continued)

OTHER PUBLICATIONS

Kasei Optonix, Ltd., http://www.kasei-optonix.co.jp/english/products/phosphor/lamp.html, Aug. 24, 2007.
(Continued)

*Primary Examiner* — Paul Lee
(74) *Attorney, Agent, or Firm* — Vista IP Law Group, LLP

(57) ABSTRACT

A photoluminescence color display comprises a display panel that displays red, green and blue pixel areas, an excitation source operable to generate excitation radiation for operating the display, and a photoluminescence color-element plate. The color-element plate comprises at least one photoluminescence material, such as a phosphor material or quantum dots, that is operable to emit light corresponding to red, green and blue pixel areas of the display in response to said excitation radiation. Additionally, the photo-luminescence color display comprises a wavelength selective filter that is provided between the color-element plate and the excitation source. The filter has a transmission characteristic that allows the passage of excitation radiation from the excitation source to excite the at least one photoluminescence material whilst preventing the passage of photoluminescence light back to the excitation source thereby prevent cross contamination of light among the different pixel areas of the display.

36 Claims, 11 Drawing Sheets

(56) References Cited

U.S. PATENT DOCUMENTS

| | | |
|---|---|---|
| 3,670,193 A | 6/1972 | Thorington et al. |
| 3,676,668 A | 7/1972 | Collins et al. |
| 3,691,482 A | 9/1972 | Pinnow et al. |
| 3,709,685 A | 1/1973 | Hercock et al. |
| 3,743,833 A | 7/1973 | Martie et al. |
| 3,763,405 A | 10/1973 | Mitsuhata |
| 3,793,046 A | 2/1974 | Wanmaker et al. |
| 3,819,973 A | 6/1974 | Hosford |
| 3,819,974 A | 6/1974 | Stevenson et al. |
| 3,849,707 A | 11/1974 | Braslau et al. |
| 3,875,456 A | 4/1975 | Kano et al. |
| 3,932,881 A | 1/1976 | Mita et al. |
| 3,937,998 A | 2/1976 | Verstegen et al. |
| 3,972,717 A | 8/1976 | Wiedemann |
| 4,047,075 A | 9/1977 | Schober |
| 4,081,764 A | 3/1978 | Christmann et al. |
| 4,104,076 A | 8/1978 | Pons |
| 4,143,394 A | 3/1979 | Schoberl |
| 4,176,294 A | 11/1979 | Thornton, Jr. |
| 4,176,299 A | 11/1979 | Thornton |
| 4,211,955 A | 7/1980 | Ray |
| 4,305,019 A | 12/1981 | Graff et al. |
| 4,315,192 A | 2/1982 | Skwirut et al. |
| 4,443,532 A | 4/1984 | Joy et al. |
| 4,559,470 A | 12/1985 | Murakami et al. |
| 4,573,766 A | 3/1986 | Bournay, Jr. et al. |
| 4,618,555 A | 10/1986 | Suzuki et al. |
| 4,638,214 A | 1/1987 | Beers et al. |
| 4,667,036 A | 5/1987 | Iden et al. |
| 4,678,285 A | 7/1987 | Ohta et al. |
| 4,727,003 A | 2/1988 | Ohseto et al. |
| 4,772,885 A | 9/1988 | Uehara et al. |
| 4,830,469 A | 5/1989 | Breddels et al. |
| 4,845,223 A | 7/1989 | Seybold et al. |
| 4,859,539 A | 8/1989 | Tomko et al. |
| 4,915,478 A | 4/1990 | Lenko et al. |
| 4,918,497 A | 4/1990 | Edmond |
| 4,946,621 A | 8/1990 | Fouassier et al. |
| 4,992,704 A | 2/1991 | Stinson |
| 5,077,161 A | 12/1991 | Law |
| 5,110,931 A | 5/1992 | Dietz et al. |
| 5,126,214 A | 6/1992 | Tokailin et al. |
| 5,131,916 A | 7/1992 | Eichenauer et al. |
| 5,143,433 A | 9/1992 | Farrell |
| 5,143,438 A | 9/1992 | Giddens et al. |
| 5,166,761 A | 11/1992 | Olson et al. |
| 5,208,462 A | 5/1993 | O'Connor et al. |
| 5,210,051 A | 5/1993 | Carter, Jr. |
| 5,211,467 A | 5/1993 | Seder |
| 5,237,182 A | 8/1993 | Kitagawa et al. |
| 5,264,034 A | 11/1993 | Dietz et al. |
| 5,283,425 A | 2/1994 | Imamura |
| 5,369,289 A | 11/1994 | Tamaki et al. |
| 5,405,709 A | 4/1995 | Littman et al. |
| 5,439,971 A | 8/1995 | Hyche |
| 5,518,808 A | 5/1996 | Bruno et al. |
| 5,535,230 A | 7/1996 | Abe |
| 5,557,168 A | 9/1996 | Nakajima et al. |
| 5,563,621 A | 10/1996 | Silsby |
| 5,578,839 A | 11/1996 | Nakamura et al. |
| 5,583,349 A | 12/1996 | Norman et al. |
| 5,585,640 A | 12/1996 | Huston et al. |
| 5,619,356 A | 4/1997 | Kozo et al. |
| 5,660,461 A | 8/1997 | Ignatius et al. |
| 5,677,417 A | 10/1997 | Muellen et al. |
| 5,679,152 A | 10/1997 | Tischler et al. |
| 5,763,901 A | 6/1998 | Komoto et al. |
| 5,770,887 A | 6/1998 | Tadatomo et al. |
| 5,771,039 A | 6/1998 | Ditzik |
| 5,777,350 A | 7/1998 | Nakamura et al. |
| 5,869,199 A | 2/1999 | Kido |
| 5,926,239 A | 7/1999 | Kumar et al. |
| 5,959,316 A | 9/1999 | Lowery |
| 5,962,971 A | 10/1999 | Chen |
| 6,137,217 A | 10/2000 | Pappalardo et al. |
| 6,295,106 B1 | 9/2001 | Fukuzawa et al. |
| 6,340,824 B1 | 1/2002 | Komoto et al. |
| 6,348,669 B1 | 2/2002 | Rudd Little et al. |
| 6,504,301 B1 | 1/2003 | Lowery |
| 6,576,488 B2 | 6/2003 | Collins et al. |
| 6,586,874 B1 | 7/2003 | Komoto et al. |
| 6,600,175 B1 | 7/2003 | Baretz et al. |
| 6,642,618 B2 | 11/2003 | Yagi et al. |
| 6,642,652 B2 | 11/2003 | Collins et al. |
| 6,844,903 B2 | 1/2005 | Mueller-Mach et al. |
| 6,869,812 B1 | 3/2005 | Liu |
| 6,891,203 B2 | 5/2005 | Kozawa et al. |
| 7,006,172 B2 | 2/2006 | Kawana et al. |
| 7,153,015 B2 | 12/2006 | 8rukilacchio |
| 7,248,310 B2 | 7/2007 | Mueller-Mach |
| 7,311,858 B2 | 12/2007 | Wang et al. |
| 7,429,340 B2 | 9/2008 | Kwon |
| 7,479,662 B2 | 1/2009 | Soules et al. |
| 7,615,795 B2 | 11/2009 | Baretz et al. |
| 7,943,945 B2 | 5/2011 | Baretz et al. |
| 2001/0004108 A1 | 6/2001 | Iwamatsu et al. |
| 2001/0038424 A1 | 11/2001 | Kotani et al. |
| 2001/0038426 A1 | 11/2001 | Bechtel et al. |
| 2002/0063813 A1 | 5/2002 | Dirscherl et al. |
| 2002/0145685 A1 | 10/2002 | Mueller-Mach et al. |
| 2002/0167624 A1* | 11/2002 | Paolini et al. .................. 349/61 |
| 2004/0016938 A1 | 1/2004 | Baretz et al. |
| 2005/0052590 A1* | 3/2005 | Ochiai et al. .................. 349/71 |
| 2005/0073495 A1 | 4/2005 | Harbers et al. |
| 2005/0185125 A1 | 8/2005 | Miyachi et al. |
| 2005/0253114 A1 | 11/2005 | Setlur et al. |
| 2005/0264715 A1* | 12/2005 | Kahen et al. .................. 349/61 |
| 2006/0022208 A1 | 2/2006 | Kim et al. |
| 2006/0028122 A1 | 2/2006 | Wang et al. |
| 2006/0049416 A1 | 3/2006 | Baretz et al. |
| 2006/0065900 A1 | 3/2006 | Hsieh et al. |
| 2006/0111981 A1 | 5/2006 | Hunter |
| 2006/0238103 A1 | 10/2006 | Choi et al. |
| 2006/0238671 A1 | 10/2006 | Kim et al. |
| 2006/0244367 A1 | 11/2006 | Im et al. |
| 2007/0040097 A1* | 2/2007 | Mok et al. .................. 250/208.1 |
| 2007/0058106 A1 | 3/2007 | Kim et al. |
| 2007/0146584 A1* | 6/2007 | Wang et al. .................. 349/106 |
| 2007/0263408 A1* | 11/2007 | Chua .................. 362/612 |
| 2008/0048199 A1* | 2/2008 | Ng .................. 257/98 |
| 2008/0224597 A1 | 9/2008 | Baretz et al. |
| 2008/0224598 A1 | 9/2008 | Baretz et al. |
| 2008/0284316 A1* | 11/2008 | Kurihara et al. .................. 313/503 |
| 2009/0051853 A1* | 2/2009 | Thomas et al. .................. 349/86 |
| 2010/0015658 A1* | 1/2010 | Yang et al. .................. 435/29 |
| 2010/0264371 A1* | 10/2010 | Nick .................. 252/301.36 |
| 2011/0228527 A1* | 9/2011 | Van Gorkom et al. .................. 362/231 |

FOREIGN PATENT DOCUMENTS

| | | |
|---|---|---|
| GB | 2 017 409 | 10/1979 |
| JP | S50-79379 | 11/1973 |
| JP | 60061725 A | 4/1985 |
| JP | 60170194 | 9/1985 |
| JP | 862-189770 | 8/1987 |
| JP | H01-1794 71 | 7/1989 |
| JP | 01230091 A | 9/1989 |
| JP | 01-260707 | 10/1989 |
| JP | H02-91980 | 3/1990 |
| JP | H3-24692 | 3/1991 |
| JP | 4010665 | 1/1992 |
| JP | 4010666 | 1/1992 |
| JP | 04-289691 | 10/1992 |
| JP | 4-321280 | 11/1992 |
| JP | 05-152609 | 6/1993 |
| JP | 6207170 | 7/1994 |
| JP | 6-267301 | 9/1994 |
| JP | 6283755 | 10/1994 |
| JP | 07-099345 | 4/1995 |
| JP | H07-176794 | 7/1995 |
| JP | 07-235207 | 9/1995 |
| JP | H7-282609 | 10/1995 |
| JP | H08-7614 | 1/1996 |
| JP | 8-250281 | 9/1996 |

(56) References Cited

FOREIGN PATENT DOCUMENTS

| | | |
|---|---|---|
| JP | 11007016 A | 1/1999 |
| JP | 2900928 | 3/1999 |
| JP | 2003 043483 A | 2/2003 |
| JP | P2003-234513 | 8/2003 |
| JP | 2003030019 A | 11/2003 |
| JP | 2004-094039 | 3/2004 |
| JP | 2005068269 A | 3/2005 |
| JP | P3724490 | 9/2005 |
| JP | P3724498 | 9/2005 |
| JP | 2006077153 A | 3/2006 |
| JP | 2006114290 A | 4/2006 |
| JP | 2007 178902 A | 7/2007 |
| JP | 2008287073 A | 11/2008 |
| KR | 1998-040607 | 8/1998 |
| KR | 0538104 | 12/2005 |
| KR | 10-1005305 B1 | 1/2011 |
| WO | WO 9108508 | 6/1991 |
| WO | WO 2006022792 A2 | 3/2006 |
| WO | WO 2006108013 A2 | 10/2006 |

OTHER PUBLICATIONS

Kang H. et al., "Eu-doped barium strontium silicate phosphor particles prepared from spray solution containing NH4Cl flux by spray pyrolysis," Materials Science and Engineering B, Elsevier Sequoia, Lausanne, Switzerland, vol. 121, No. 1-2, Jul. 25, 2005, pp. 81-85.
International Search Report and Written Opinion dated Jan. 28, 2008 for International Application No. PCT/US2007/015515.
Non-Final Office Action dated Sep. 28, 2011 for U.S. Appl. No. 11/824,979.
Non-Final Office Action dated Aug. 5, 2010 for U.S. Appl. No. 11/824,979.
Non-Final Office Action dated Jan. 8, 2010 for U.S. Appl. No. 11/824,979.
Non-Final Office Action dated Apr. 30, 2009 for U.S. Appl. No. 11/824,979.
Final Office Action dated Jun. 22, 2012 for U.S. Appl. No. 11/824,979.
Final Office Action dated Mar. 2, 2011 for U.S. Appl. No. 11/824,979.
Non-Final Office Action dated Oct. 26, 2011 for U.S. Appl. No. 11/906,540.
Ex-Parte Quayle Action dated Jul. 19, 2012 for U.S. Appl. No. 11/906,540.
Chinese Office Action and English Translation dated Apr. 2, 2010 for Chinese Appln. No. 200780025601.6.
Chinese Office Action and English Translation dated Apr. 1, 2011 for Chinese Appln. No. 200780025601.6.
Chinese Office Action and English Translation dated Mar. 16, 2012 for Chinese Appln. No. 200780025601.6.
Foreign Office Action and English Translation dated Jun. 2, 2010 for European Appln. No. 7835992.4.
Foreign Office Action and English Translation dated Nov. 17, 2010 for European Appln. No. 7835992.4.
Foreign Office Action and English Translation dated Feb. 17, 2011 for Korean Appln. No. 10-2009-7002518.
Foreign Office Action and English Translation dated Feb. 24, 2012 for Korean Appln. No. 10-2009-7002518.
Foreign Office Action and English Translationdated Aug. 11, 2011 for Tawian Appln. No. 96124790.
Foreign Office Action and English Translation dated May. 11, 2010 for Japanese Appln. No. 2009-518374.
Foreign Office Action and English Translation dated Sep. 6, 2011 for Japanese Appln. No. 2009-518374.
Written Questioning and English Translation dated Jun. 19, 2012 for Japanese Appln. No. 2009-518374.
Kasei Optonix, Ltd., http://www.kasei-optonix.co.jp/english/products/phosphor/lamp.html, Aug. 24, 2007, 3 pages.
Kang H. et al., "Eu-doped barium strontium silicate phosphor particles prepared from spray solution containing NH4Cl flux by spray pyrolysis," Materials Science and Engineering B, Elsevier Sequoia, Lausanne, Switzerland, vol. 121, No. 1-2, Jul. 25, 2005, pp. 81-85.
Appeal Decision dated Jan. 15, 2013 for Japanese Appln. No. 2009-518374.
Non-Final Office Action dated Mar. 15, 2013 for U.S. Appl. No. 11/906,540.
CRC Handbook, 63rd Ed., (1983) p. E-201.
Lumogen® F Violet 570 Data Sheet; available at the BASF Chemical Company website Lumogen® F Violet 570 Data Sheet; available at the BASF Chemical Company website URL,http://worldaccount.basf.com/wa/EUen_GB/Catalog/Pigments/doc4/BASF/PRD/30048274/.pdf?title=Technicai%20Datasheet&asset_type=pds/pdf& language=EN&urn=urn:documentum:eCommerce_soi_EU : 09007bb280021e27.pdf:09007bb280021e27.pdf.
Saleh and Teich, Fundamentals of Photonics, New York: John Wiley & Sons, 1991, pp. 592-594.
The Penguin Dictionary of Electronics, 3rd edition, pp. 315,437-438, 509-510, copyright 1979, 1988, and 1998.
LEDs and Laser Diodes, Electus Distribution, copyright 2001, available at URL:http://www.jaycar.com.au/images_uploaded/ledlaser.Pdf.
"Fraunhofer-Gesellschaft: Research News Special1997", http://www.fhg.de/press/md-e/md1997/sondert2.hlm,(accessed on Jul. 23, 1998), Jan. 1997, Publisher: Fraunhofer Institute.
Krames, M., et al., "Status and Future of High-Power Light-Emitting Diodes for Solid-Slate Lighting", "Journal of Display Technology", Jun. 2007, pp. 160-175, vol. 3, No. 2.
Kudryashov, V., et al., "Spectra of Superbright Blue and Green InGaN/AlGaN/GaN Light-Emitting diodes", "Journal of the European Ceramic Society", May 1996, pp. 2033-2037, vol. 17.
Lester, S., et al., "High dislocation densities in high efficiency GaN-based light-emitting diodes", "Appl. Phys. Lett.", Mar. 6, 1995, pp. 1249-1251, vol. 66, No. 10.
Mukai, T., et al., "Recent progress of nitride-based light emitting devices", "Phys. Stat. Sol.", Sep. 2003, pp. 52-57, vol. 200, No. 1.
Nakamura, S., et al., "High-power InGaN single-quantum-well-structure blue and violet light-emitting diodes", "Appl. Phys. Lett.", Sep. 25, 1995, pp. 1868-1870, vol. 67, No. 13.
Nakamura, S., et al., "The Blue Laser Diode: GaN Based Light Emitters and Lasers", Mar. 21, 1997, p. 239, Publisher: Springer-Verlag.
Nakamura, S., et al., "The Blue Laser Diode: The Complete Story, 2nd Revised and Enlarged Edition", Oct. 2000, pp. 237-240, Publisher: Springer-Verlag.
Mar. 22, 2012 Office Action in U.S. Appl. No. 12/131,119, issued by Steven Y. Horikoshi.
Pei, Q, et al., "Polymer Light-Emitting Electrochemical Cells", "Science", Aug. 25, 1995, pp. 1086-1088, vol. 269, No. 5227.
Dictionary Definition of Phosphor, Oxford English Dictionary Online, Mar. 9, 2012 (Only partial available due to corrupt file as provided on Mar. 22, 2012 in U.S. Appl. No. 12/131,119; Request for Full Reference filed).
Feb. 21, 2012 Office Action in U.S. Appl. No. 12/131,118, issued by Abul Kalam.
Jan. 7, 2011 Office Action in U.S. Appl. No. 12/131,119.
May 4, 2010 Office Action in U.S. Appl. No. 12/131,119, issued by Examiner.
Jul. 7, 2011 Office Action in U.S. Appl. No. 12/131,118, issued by Abu I Kalam.
Jul. 14, 2011 Office Action in U.S. Appl. No. 12/131,119, issued by Steve Horikoshi.
Aug. 26, 2010 Office Action in U.S. Appl. No. 12/131,118, issued by Examiner.
Sep. 29, 2009 Office Action in U.S. Appl. No. 11/264,124, issued by Abu I Kalam.
Oct. 20, 2008 Office Action in U.S. Appl. No. 10/623,198, issued by Abu I Kalam.
Nov. 30. 2010 Office Action in U.S. Appl. No. 12/131/118. issued by Examiner.
Dec. 16. 2004 Office Action in U.S. Appl. No. 10/623,198, issued by Thao X. Le.
Jan. 29, 2007 Office Action in U.S. Appl. No. 10/623,198, issued by Thao X. Le.

(56) References Cited

OTHER PUBLICATIONS

Jan. 30, 2006 Office Action in U.S. Appl. No. 11/264,124, issued by Thao X. Le.
Feb. 4, 2005 Office Action in U.S. Appl. No. 10/623,198, issued by Thao X. Le.
Feb. 7, 2007 Office Action in U.S. Appl. No. 11/264,124, issued by Thao X. Le.
Feb. 26, 2008 Office Action in U.S. Appl. No. 11/264,124, issued by Abu I Kalam.
Mar. 2, 2009 Office Action in U.S. Appl. No. 10/623,198, issued by Abu I Kalam.
Mar. 4, 2011 Notice of Allowance, Notice of Allowability, Examiner's Interview Summary, Examiner's Amendment/Comment and Examiner's Statement of Reason for Allowance in U.S. Appl. No. 11/264,124, issued by Abu I Kalam.
Mar. 7, 2008 Office Action in U.S. Appl. No. 10/623,198, issued by Abu I Kalam.
Mar. 28, 2006 Office Action in U.S. Appl. No. 10/623,198, issued by Thao X. Le.
Apr. 15, 2009 Office Action in U.S. Appl. No. 11/264.124, issued by Abu I Kalam.
Jun. 14, 2006 Office Action in U.S. Appl. No. 11/264,124, issued by Thao X. Le.
Jun. 26, 2007 Office Action in U.S. Appl. No. 10/623,198, issued by Thao X. Le.
Jul. 10, 2008 Office Action in U.S. Appl. No. 11/264.124, issued by Abu I Kalam.
Jul. 14, 2005 Notice of Allowance, Notice of Allowability, and Examiner's Statement of Reasons for Allowance in U.S. Appl. No. 10/623,198, issued by Thao X. Le.
Aug. 21, 2006 Office Action in U.S. Appl. No. 10/623,198, issued by Thao X. Le.
Aug. 24, 2007 Office Action in U.S. Appl. No. 11/264,124, issued by Thao X. Le.
Sep. 17, 2009 Notice of Allowance, Notice of Allowability, Examiner's Amendmeni/Comment, and Examiner's Statement of Reasons for Allowance in U.S. Appl. No. 10/623,198, issued by Abul Kalam.
Amano, H., et al., "UV and blue electroluminescence from Al/GaN:Mg/GaN LED treated with low-energy electron beam irradiation (LEEBI)", "Institute of Physics: Conference Series", 1990, pp. 725-730, vol. 106, No. 10.
Roman. D., "LEDs Turn A Brighter Blue", "Electronic Buyers' News", Jun. 19, 1995, pp. 28 and 35, vol. 960, Publisher: CMP Media LLC.
Bradfield, P.L., et al., "Electroluminescence from sulfur impurities in a p—n junction formed in epitaxial silicon", "Appl. Phys. Lett", 07110/1989, pp. 10D-102, vol. 55, No. 2.
Das, N.C., et al., "Luminescence spectra of ann-channel metal-oxide-semiconductor field-effect transistor at breakdown", 1990, pp. 1152-1153, vol. 56, No. 12.
Jang, S., "Effect of Avalanche-Induced Light Emission on the Multiplication Factor in Bipolar Junction Transistors", "Solid-State Electronics", 1991, pp. 1191-1196, vol. 34, No. 11.
Pavan, P., et al., "Explanation of Current Crowding Phenomena Induced by Impact Ionization in Advanced Si Bipolar Transistors by Means of . . . ", "Microelectronic Engineering", 1992, pp. 699-702, vol. 19.
Yang, Y., et al., "Voltage controlled two color light-emitting electrochemical cells", "Appl. Phys. Lett.", 1996, vol. 68, No. 19.
Zanoni, E., et al., "Measurements of Avalanche Effects and Light Emission in Advanced Si and SiGe Bipolar Transistors", "Microelectronic Engineering", 1991, pp. 23-26, vol. 15.
Zanoni, E., et al., "Impact ionization, recombination, and visible light emission in AlGaAs/GaAs high electron mobility transistors", "J. Appl. Phys.", 1991, pp. 529-531, vol. 70, No. 1.
Zhiming, Chen, et al., "Amorphous thin film white-LED and its light-emitting mechanism", "Conference Record of the 1991 International Display Research Conference", Oct. 1991, pp. 122-125.
Apr. 14, 2010 Office Action in U.S. Appl. No. 11/264,124, issued by Examiner.

Adachi, C. et al., "Blue light-emitting organic electroluminescent devices", "Appl. Phys. Lett.", Feb. 26, 1990, pp. 799-801, vol. 56, No. 9.
Akasaki, Isamu, et al., "Photoluminescence of Mg—doped p—type GaN and electroluminescence of GaN p—n junction LED", "Journal of Luminescence", Jan.-Feb. 1991, pp. 666-670, vol. 48-49 pt. 2.
Armaroli, N. et al., "Supramolecular Photochemistry and Photophysics.", "J. Am. Chern. Soc.", 1994, pp. 5211-5217, vol. 116.
Berggren, M., et al., "White light from an electroluminescent diode made from poly[3(4-octylphenyl)-2,2'-bithiophene] and an oxadiazole . . . ", "Journal of Applied Physics", Dec. 1994, pp. 7530-7534, vol. 76, No. 11.
Berggren, M. et al., "Light-emitting diodes with variable colours from polymer blends", "Nature", Dec. 1, 1994, pp. 444-446, vol. 372.
Boonkosum, W. et al., "Novel Flat Panel display made of amorphous SiN:H/SiC:H thin film LED", "Physical Concepts and Materials for Novel Optoelectronic Device Applications II", 1993, pp. 40-51, vol. 1985.
Chao, Zhang Jin, et al., "White light emitting glasses", "Journal of Solid State Chemistry", 1991, pp. 17-29, vol. 93.
Comrie, M. , "Full Color LED Added to Lumex's Lineup", "EBN", Jun. 19, 1995, p. 28.
Zdanowski, Marek, "Pulse operating up-converting phosphor LED", "Electron Technol.", 1978, pp. 49-61, vol. 11, No. 3.
Forrest, S. et al. , "Organic emitters promise a new generation of displays", "Laser Focus World", Feb. 1995, pp. 99-107.
Hamada, Y. et al. , "Blue-Light-Emitting Organic Electroluminescent Devices with Oxadiazole Dimer Dyes as an Emitter", "Jpn. J. Appl. Physics", Jun. 1992, pp. 1812-1816, vol. 31.
Hamakawa, Yoshihiro, et al., "Toward a visible light display by amorphous SiC:H alloy system", "Optoelectronics—Devices and Technologies", Dec. 1989, pp. 281-294, vol. 4, No. 2.
Hirano, Masao, et al., "Various performances of fiber-optical temperature sensor utilizing infrared-to-visible conversion phosphor", "Electrochemisty (JP)", Feb. 1987, pp. 158-164, vol. 55, No. 2, Publisher: Electrochemical Society of Japan.
El Jouhari, N., et al., "White light generation using fluorescent glasses activated by Ce3+, Tb3+ and Mn2+ ions", "Journal De Physique IV, Colloque C2", Oct. 1992, pp. 257-260, vol. 2.
Kido, J. et al. , "1,2,4-Triazole Derivative as an Electron Transport Layer in Organic Luminescent Devices", "Jpn. J. Appl. Phys. ", Jul. 1, 1993, pp. L917-L920, vol. 32.
Kido, J., et al., "White light-emitting organic electroluminescent devices using the poly(N-vinylcarbazole) emitter layer doped with . . . ", "Appl. Phys. Lett.", Feb. 14, 1994, pp. 815-817, vol. 64, No. 7.
Kido, J. et al. , "Bright blue electroluminescence fom poly(N-vinylcarbazole)", "Appl. Phys. Letters", Nov. 8, 1993, pp. 2627-2629, vol. 63, No. 19.
Larach, S., et al., "Blue emitting luminescent phosphors: Review and status", "Int'l Workshop on Electroluminescence", 1990, pp. 137-143.
Maruska, H.P., et al., "Violet luminescence of Mg—doped GaN", "Appl. Phys. Lett.", Mar. 15, 1973, pp. 303-305, vol. 22, No. 6.
Maruska, H.P., "Gallium nitride light-emitting diodes (dissertation)", "Dissertation Submitted to Stanford University", Nov. 1973.
McGraw-Hill, "McGraw-Hill Dictionary of Scientific and Technical Terms, Third Edition", "McGraw-Hill Dictionary of Scientific and Technical Terms", 1984, pp. 912 and 1446, Publisher: McGraw-Hill.
McGraw-Hill, "McGraw-Hill Encyclopedia of Science and Technology, Sixth Edition", "McGraw-Hill Encyclopedia of Science and Technology", 1987, pp. 582 and 60-63, vol. 9-10, Publisher: McGraw-Hill.
Mimura, Hidenori, et al., "Visible electroluminescence from uc—SiC/porous Si/c—Si p—n junctions", "Int. J. Optoelectron.", 1994, pp. 211-215, vol. 9, No. 2.
Miura, Noboru, et al., "Several Blue-Emitting Thin-Film Electroluminescent Devices", "Jpn. J. Appl. Phys.", Jan. 15, 1992, pp. L46-L48, vol. 31, No. Part 2, No. 1A IB.
Muench, W.V., et al., "Silicon carbide light-emitting diodes with epitaxial junctions", "Solid-State Electronics", Oct. 1976, pp. 871-874, vol. 19, No. 10.

(56) References Cited

OTHER PUBLICATIONS

Pankove, J.I., et al., "Scanning electron microscopy studies of GaN", "Journal of Applied Physics", Apr. 1975, pp. 1647-1652, vol. 46, No. 4.

Sato, Yuichi, et al., "Full-color fluorescent display devices using a near-UV light-emitting diode", "Japanese Journal of Applied Physics", Jul. 1996, pp. L838-L839, vol. 35, No. ?A.

Tanaka, Shosaku, et al., "Bright white-light electroluminescence based on nonradiative energy transfer in Ce-and Eu-doped SrS thin films", "Applied Physics Letters", Nov. 23, 1987, pp. 1661-1663, vol. 51, No. 21.

Tanaka, Shosaku, et al., "White Light Emitting Thin-Film Electroluminescent Devices with SrS:Ce,Cl/ZnS:Mn Double Phosphor Layers", "Jpn. J. Appl. Phys.", Mar. 20, 1986, pp. L225-L227, vol. 25, No. 3.

Ura, M., "Recent trends of development of silicon monocarbide blue-light emission diodes", "Kinzoku ", 1989, pp. 11-15, vol. 59, No. 9.

Werner, K., "Higher Visibility for LEDs", "IEEE Spectrum", Jul. 1994, pp. 30-39.

Wojciechowski, J. et al., "Infrared-To-Blue Up-Converting Phosphor", "Electron Technology", 1978, pp. 31-47, vol. 11, No. 3.

Yamaguchi, Y. et al., "High-Brightness SiC Blue LEDs and Their Application to Full Color LED Lamps", "Optoelectronics-Devices and Technologies", Jun. 1992, pp. 57-67, vol. 7, No. 1.

Yoshimi, Masashi, et al., "Amorphous carbon basis blue light electroluminescent device", "Optoelectronics—Devices and Technologies", Jun. 1992, pp. 69-81, vol. 7, No. 1.

Morkoc et al., "Large-band-gap SiC, 111-V nitride, and II-VI ZnSe—based semiconductor device technologies", J. Appl. Phys. 76(3), 1; Mar. 17, 1994; Illinois University.

Reexam Non-Final Office Action dated Sep. 20, 2010 for U.S. Appl. No. 90/010,940.

Reexam Non-Final Office Action dated Mar. 3, 2011 for U.S. Appl. No. 90/010,940.

Reexam Final Office Action dated Nov. 7, 2011 for U.S. Appl. No. 90/010,940.

Reexam Non-Final Office Action dated Jan. 26, 2012 for U.S. Appl. No. 90/010,940.

Reexam Final Office Action dated May 24, 2012 for U.S. Appl. No. 90/010,940.

Reexam Advisory Action dated Sep. 28, 2012 for U.S. Appl. No. 90/010,940.

Foreign Office Action dated Apr. 24, 2012 for Chinese Appln. No. 201010525492.8.

Foreign Office Action dated Oct. 29, 2012 for Chinese Appln. No. 200780032995.8.

Foreign Office Action dated Jul. 5, 2012 for European Appln. No. 07811039.2.

Final Office Action dated May 20, 2013 for U.S. Appl. No. 11/824,979.

Chinese Office Action dated Apr. 1, 2013 for Chinese Appln. No. 200780025601.6.

International Search Report dated May 30, 2013 for PCT Appln. No. PCT/US13/26256.

* cited by examiner

PHOTOLUMINESCENCE COLOR DISPLAY COMPRISING QUANTUM DOTS MATERIAL AND A WAVELENGTH SELECTIVE FILTER THAT ALLOWS PASSAGE OF EXCITATION RADIATION AND PREVENTS PASSAGE OF LIGHT GENERATED BY PHOTOLUMINESCENCE MATERIALS

CLAIM OF PRIORITY

The present application is a continuation-in-part of U.S. patent application Ser. No. 11/824,979 filed Jul. 3, 2007, entitled "PHOTO-LUMINESCENCE COLOR LIQUID CRYSTAL DISPLAY", which claims the benefit of priority to U.S. Provisional Application No. 60/819,420 filed Jul. 6, 2006, the specification and drawings of which applications are incorporated herein by reference in their entirety.

BACKGROUND OF THE INVENTION

1. Field of the Invention

The present invention relates to the field of color displays, such as flat panel displays and color liquid crystal displays (LCDs), which convert electrical signals into color images. In particular, the invention concerns color, transmissive displays in which photoluminescence materials are used to generate color light in response to excitation radiation from a backlight, such displays being termed photoluminescence color displays or photoluminescent color displays.

2. Description of the Related Art

The light that lights up our world and allows us to see comes from solar energy in what is known as the visible region of the solar, electromagnetic, spectrum. This region is a very narrow segment of the total spectrum, the visible region being that portion visible to the human eye. It ranges in wavelength from about 440 nm in the extreme blue or near ultraviolet to about 690 nm in the red or near infrared. The middle of the visible region is a green color at about 555 nm. Human vision is such that what appears as white light is really composed of weighted amounts of a continuum of so-called black body radiation. In order to produce light that appears "white" to a human observer, the light needs to have component weights of about 30 percent in the red (R), 59 percent in the green (G) and 11 percent in the blue (B).

The perception of light as being white can be maintained even when the amount of one of the RGB component colors is changed, as long as the amounts of the other two can be adjusted to compensate. For example, if the red light source is shifted to a longer wavelength, the white light will appear more cyan in color if the other two colors remain unchanged. White balance may be restored, however, by changing the weight of the green and blue to levels other than their original values of 11 and 59 percent, respectively. The human eye does not have the ability to resolve closely spaced colors into the individual red, green, and blue (RGB) primary components of white light, since the human vision system mixes these three components to form intermediates. The reader probably recalls that human vision registers (and/or detects) only the three primary colors, and all other colors are perceived as combinations of these primaries.

Color liquid crystal displays (LCDs) in use today are based on picture elements, or "pixels," formed by a matrix/array of liquid crystal (LC) cells. As is known the intensity of the light passing through a LC can be controlled by changing the angle of polarization of the light in response to an electrical field, voltage, applied across the LC. For a color LCD each pixel is actually composed of three "sub-pixels": one red, one green, and one blue. Taken together, this sub-pixel triplet makes up what is referred to as a single pixel. What the human eye perceives as a single white pixel is actually a triplet of RGB sub-pixels with weighted intensities such that each of the three sub-pixels appears to have the same brightness. Likewise, when the human eye sees a solid white line, what is actually being displayed is a series or line of RGB triplets. The multi-sub-pixel arrangement may be manipulated by tuning the photometric output of the light source to a set of desired color coordinates, thereby offering a superior color rendering index (CRI) and a dynamic color selection for a large color palette.

In current color, transmissive LCD technology, this color tuning is implemented with the use of color filters. The principle of operation of a conventional color, transmissive LCD is based upon a bright white light backlighting source located behind a liquid crystal (LC) matrix, and a panel of color filters positioned on an opposite side of the liquid crystal matrix. The liquid crystal matrix is digitally switched to adjust the intensity of the white light from the backlighting source reaching each of the color filters of each pixel, thereby controlling the amount of colored light transmitted by the RGB sub-pixels. Light exiting the color filters generates the color image.

A typical LCD structure is sandwich-like in which the liquid crystal is provided between two glass panels; one glass panel containing the switching elements that control the voltage being applied across electrodes of the LC corresponding to respective sub-pixel, and the other glass panel containing the color filters. The switching elements for controlling the LC matrix which are located on the back of the structure, that is facing the backlighting source; typically comprise an array of thin film transistors (TFTs) in which a respective TFT is provided for each sub-pixel. The color filter glass panel is a glass plate with a set of primary (red, green, and blue) color filters grouped together. Light exits the color filter glass panel to form the image.

As is known LCs have the property of rotating the plane of polarization of light as a function of the applied electric field, voltage. Through the use of polarizing filters and by controlling the degree of rotation of the polarization of the light as a function of the voltage applied across the LC the amount of white light supplied by the backlighting source to the filters is controlled for each red, green and blue sub-pixel. The light transmitted through the filters generates a range of colors for producing images that viewers see on a TV screen or computer monitor.

Typically, the white light source used for backlighting comprises a mercury-filled cold cathode fluorescent lamp (CCFL). CCFL tubes are typically glass, and filled with inert gases. The gases ionize when a voltage is applied across electrodes positioned within the tube, and the ionized gas produces ultraviolet (UV) light. In turn, the UV light excites one or more phosphors coated on the inside of the glass tube, generating visible light. Reflectors redirect the visible light to the monitor and spread it as uniformly as possible, backlighting the thin, flat LCD. The backlight itself has always defined the color temperature and color space available, which has typically been approximately 75 percent of NTSC (National Television Standards Committee) requirements.

In the known LCD systems, the color filter is a key component for sharpening the color of the LCD. The color filter of a thin film transistor liquid crystal display (TFT LCD) consists of three primary colors (RGB) which are included on a color filter plate. The structure of the color filter plate comprises a black (opaque) matrix and a resin film, the resin film containing three primary-color dyes or pigments. The elements of the color filter line up in one-to-one correspondence with the unit pixels on the TFT-arrayed glass plate. Since the sub-pixels in a unit pixel are too small to be distinguished independently, the RGB elements appear to the human eye as a mixture of the three colors. As a result, any color, with some qualifications, can be produced by mixing these three primary colors.

The development over recent years of high brightness light emitting diodes (LEDs) has made possible LED backlighting with an enhanced color spectrum and has been used to provide a wider range of spectral colors for displays. In addition, LED backlighting has allowed for a tuning of the white point, when allied with a feedback sensor, ensuring the display operates consistently to a pre-defined performance.

In these LED based backlighting systems, the light output from red, green and blue (RGB) LEDs is mixed in equal proportions to create white light. This approach unfortunately requires complex driving circuitry to properly control the intensities of the three different color LEDs since different circuitry is necessary because each of the LEDs demands different drive conditions.

An alternative approach has been to use a white emitting LED which comprises a single blue LED chip coated with a yellow fluorescent phosphor; the yellow phosphor absorbing a proportion of the blue light emitted by the blue LED, and then re-emitting that light (in a process known as down-conversion) as yellow light. By mixing the yellow light generated by the yellow phosphor with the blue light from the blue LED, white light over the entire visible spectrum could be produced. Alternatively, an ultraviolet LED can be coated with a red-green-blue phosphor to produce white light; in this case, the energy from the ultraviolet LED is substantially non-visible, and since it cannot contribute a component to the resultant white light, it functions only as an excitation source for the phosphors. Unfortunately the white light product of such LEDs does not match well with the color filters used in current LCDs, and a significant amount of the backlight intensity is wasted.

U.S. Pat. No. 4,830,469 proposes a LCD which uses UV light to excite red, green and blue light emitting phosphor sub-pixels thereby eliminating the need for RGB color filters. Such LCDs are referred to as photoluminescence color LCDs. A mercury lamp emitting UV light of wavelength 360 nm to 370 nm is used as a backlight and the red, green and blue emitting phosphors are provided on a front substrate plate. The UV light after being modulated by the liquid crystal matrix is then incident on the phosphor sub-pixels of the front plate which emit red, green and blue light in response.

U.S. Pat. No. 6,844,903 teaches a color, transmissive LCD which supplies a uniform blue light of wavelength 460 nm to the back of the liquid crystal layer. The blue light, after being modulated by the liquid crystal layer, is then incident on the back surface of phosphor material located above the liquid crystal layer. A first phosphor material, when irradiated with the blue light, generates red light for the red pixel areas of the display, and a second phosphor material, when irradiated with the blue light, generates green light for the green pixel areas of the display. No phosphor material is deposited over the blue sub-pixel areas since blue light is provided from the backlight. A suitable diffuser (e.g. scattering powder) can be located at the blue sub-pixel areas so that the blue pixels match the viewing angle properties of the red and green pixels.

US 2006/0238103 and US 2006/0244367 teach photoluminescence color LCDs which respectively use UV light of wavelength 360 nm to 460 nm and a near blue-UV light of wavelength 390 nm to 410 nm to excite red, green and blue light emitting phosphor sub-pixels. The use of near blue-UV backlighting reduces deterioration of liquid crystals caused by UV light.

A further example of a photoluminescence color LCD is disclosed in Japanese patent application JP 2004094039.

The present invention concerns photoluminescence color display which utilizes photoluminescence materials, such as quantum dots, inorganic and organic phosphor materials, to generate the different colors of light of the sub-pixels. What is needed in the art is a color display that uses an RGB photoluminescence based color rendering scheme to sharpen the color and enhance the brightness of the image.

SUMMARY OF THE INVENTION

Embodiments of the present invention are directed to low-cost, high energy conversion efficiency color displays, such as a LCDs, having enhanced color rendering. Color displays in accordance with embodiments of the invention enable images with a high brightness and a spectacular, vivid range of colors to be realized. Such enhanced color display have applications in a variety of electronics devices including, but not limited to, televisions, monitors and computer monitors, the view screens of satellite navigation systems and hand-held devices such as mobile telephones and personal video/music systems.

In the most general configuration, a color display of the present embodiments comprises a red-green (RG) or a red-green-blue (RGB) photoluminescence color-elements plate for generating the image to be displayed; and a monochromatic or quasi-monochromatic short-wavelength light source for exciting the photoluminescence materials (phosphor and/or quantum dots) of the color-elements plate.

A photoluminescence color display can comprise a display panel that displays red, green and blue sub-pixel areas, an excitation source operable to generate excitation radiation for operating the display, and a color-elements plate. The color-elements plate comprises at least one photoluminescence material that is operable to emit a light corresponding to red, green or blue pixel areas of the display, in response to said excitation radiation.

Since the photoluminescence process is isotropic photoluminescence generated light is generated in all directions including those back towards the excitation source that is away from the viewing side of the display. To prevent this light from being emitted from pixel areas of different colors, the color display can additionally comprise a wavelength selective filter that is disposed between the color-elements plate and the excitation source. The wavelength selective filter is configured to allow the transmission of the excitation radiation from the excitation source to excite the photoluminescence material whilst preventing (e.g. reflecting) the passage of light generated by the photoluminescence material. Such a filter can ensure that only light of a correct color is emitted from the correct pixel area.

The excitation source can comprise a blue-emitting LED with an excitation wavelength ranging from about 400 nm to about 480 nm, or a UV LED with an excitation wavelength ranging from about 360 nm to 400 nm. The radiation source may also comprise a UV emission line generated by a mercury (Hg) plasma discharge (the plasma may also come from an inert gas such as Xe or Ne) as the backlighting source, and the UV emission line may be centered about 254 nm. Alternatively, the monochromatic or quasi-monochromatic excitation source may have a wavelength with the range 147 nm to 190 nm.

In general, the monochromatic or quasi-monochromatic excitation source may be classified into one of two groups: 1) that having a wavelength ranging from about 200 nm to about 430 nm, and 2) that having a wavelength ranging from about 430 nm to 480 nm. In any event, these may be both be called short-wavelength backlighting sources.

When the excitation source is operable to emit UV excitation radiation the color display can further comprise a blue photoluminescence material corresponding to blue pixel areas which emits blue light in response to excitation radiation.

The photoluminescence color display can further comprises a liquid crystal disposed between the front and back plate of the display panel, and a matrix of electrodes defining red, green and blue pixel areas of the display and operable to selectively induce an electric field across the liquid crystal in the pixel areas for controlling transmission of light through the pixel areas. The matrix of electrodes can comprise an array of thin film transistors (TFTs), one thin film transistor corresponding to each pixel. The TFTs can be provided on the front or back plate of the display. When using UV excitation radiation and to prevent UV excitation radiation reaching and damaging the liquid crystal of the display, the color-elements plate is preferably provided on the back plate of the display ensuring that only red, green or blue light reaches the liquid crystal.

The photoluminescence materials can be provided on lower or upper faces of the back plate.

The color display can further comprise a first polarizing filter layer on the front plate and a second polarizing filter layer on the back plate and wherein the orientation of the direction of polarization of the first polarizing filter layer is perpendicular to the direction of polarization of the second polarizing filter layer.

In an embodiment a photoluminescence color display comprises: a display panel comprising a plurality of red, green and blue pixel areas; an excitation source operable to generate excitation radiation for operating the display; a photoluminescence color-elements plate comprising at least one of: a first photoluminescence material corresponding to red pixel areas of the display that is operable to emit red light in response to said excitation radiation; a second photoluminescence material corresponding to green pixel areas of the display that is operable to emit green light in response to said excitation radiation; and a third photoluminescence material corresponding to blue pixel areas of the display that is operable to emit blue light in response to said excitation radiation; and a wavelength selective filter disposed between the color-element plate and the excitation source, the wavelength selective filter having a characteristic that allows the passage of excitation radiation and prevents the passage of light generated by the photoluminescence materials.

The wavelength selective filter can block the passage of photoluminescence generated light by absorbing such light or by reflecting such light in a direction towards the front of the display such that it contributes to the displayed image. The wavelength selective filter can be configured to have a critical wavelength that is longer than the wavelength of the excitation radiation but shorter than the wavelength of light generated by said photoluminescence materials. In some embodiments the wavelength selective filter comprises a dichroic filter such a multi-layered dielectric stack.

To prevent unconverted excitation radiation being emitted from pixel areas containing a photoluminescence material, the display can further comprise a color filter plate located on a side the display panel that is distal to the excitation source and comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light. The filter areas can comprise a band pass filter with a pass band corresponding to the color of light emitted by each pixel area. Such filters not only prevent the transmission of unconverted excitation radiation but additionally can be used to narrow and/or tune the emission color of the pixel areas.

The photoluminescence material can comprise an inorganic phosphor material, an organic phosphor material, a quantum dots material or combinations thereof.

To ensure a uniform emission of the display the display can further comprise a light diffusing layer disposed between the radiation source and the photoluminescence color-elements plate.

In an embodiment a photoluminescence liquid crystal display comprises: a display panel comprising light transmissive front and back plates; an excitation source operable to generate excitation radiation for operating the display; a liquid crystal disposed between the front and back plates; a matrix of electrodes defining red, green and blue pixel areas of the display and operable to selectively induce an electric field across the liquid crystal in the pixel areas for controlling transmission of light through the pixels areas; and a photoluminescence color-elements plate, wherein the color-element plate comprises at least one of: red quantum dots material corresponding to red pixel areas that is operable to emit red light in response to said excitation radiation; green quantum dots material corresponding to green pixel areas that is operable to generate green light in response to said excitation radiation; and blue quantum dots material corresponding to blue pixel that is operable to emit blue light in response to said excitation radiation.

The quantum dots materials preferably comprise cadmium free material including: indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S_2$); copper indium gallium selenide ($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$) or copper indium selenide zinc selenide ($CuInSe_{2x}ZnSe_{1-x}$). Alternatively the quantum dost materials can comprise materials containing cadmium such as selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS) or cadmium zinc sulfide ($Cd_xZn_{1-x}S$).

The quantum dots materials can comprise core/shell nanocrystals containing different materials in an onion-like structure. The quantum dots materials can be deposited as a thin layer of quantum dots directly on a substrate using a deposition method such as a contact printing process.

In an embodiment a photoluminescence liquid crystal display comprises: a display panel comprising light transmissive front and back plates; an excitation source operable to generate excitation radiation for operating the display; a liquid crystal disposed between the front and back plates; a matrix of electrodes defining red, green and blue pixel areas of the display and operable to selectively induce an electric field across the liquid crystal in the pixel areas for controlling transmission of light through the pixels areas; and a photoluminescence color-elements plate, wherein the color-elements plate comprises at least one of: red organic dye and red quantum dot materials corresponding to red pixel areas of the display that are operable to generate red light in response to said excitation radiation; green organic dye and green quantum dot materials corresponding to the green pixel areas of the display that are operable to generate green light in response to said excitation radiation; and blue organic dye and blue quantum dot materials corresponding to blue pixel areas of the display that are operable to generate blue light in response to said excitation radiation.

In an embodiment a photoluminescence liquid crystal display comprises: a display panel comprising light transmissive front and back plates; at least one blue LED operable to emit blue excitation light having a wavelength in a range of 400 nm to 480 nm for operating the display; a liquid crystal disposed between the front and back plates; a matrix of electrodes defining red, green and blue pixel areas of the display and operable to selectively induce an electric field across the liquid crystal in the pixel areas for controlling transmission of light through the pixels areas; a first quantum dots material corresponding to red pixel areas and operable to emit red light in response to said excitation radiation; and a second quantum dots material corresponding to green pixel areas and operable to emit green light in response to said excitation radiation, wherein areas on of the display corresponding to the blue pixel areas allow transmission of the blue excitation light.

In an embodiment a photoluminescence color display comprises a display panel comprising a plurality of red, green and blue pixel areas; an excitation source operable to generate excitation radiation for operating the display; a photoluminescence color-elements plate comprising at least one of: a first photoluminescence material corresponding to red pixel areas of the display that is operable to emit red light in response to said excitation radiation; a second photoluminescence material corresponding to green pixel areas of the display that is operable to emit green light in response to said excitation radiation; and a third photoluminescence material corresponding to blue pixel areas of the display that is operable to emit blue light in response to said excitation radiation; and a color filter plate located on a side the display panel that is distal to the excitation source, wherein the color filter plate comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light.

The current LCD technology that employs color filters has only about a 10 to 20 percent efficiency of light output that is achievable at the front of a liquid crystal display. By contrast, the present embodiments using a photoluminescence material (phosphor and/or quantum dots) based color rendering scheme, including using red-green phosphor and/or quantum dots elements plus blue LED illumination, can have up to 90 percent efficiency of light output. With a broader color range, phosphors and/or quantum dots and LED backlight together render truer skin tones and vivid reds and greens, offering better contrast ratios, purity and realism, and meeting new consumer expectations.

BRIEF DESCRIPTION OF THE DRAWINGS

In order that the present invention is better understood embodiments of the invention will now be described, by way of example only, with reference to the accompanying drawings in which.

DETAILED DESCRIPTION OF THE INVENTION

Disclosed herein is a novel color rendering scheme designed to improve and enhance the brightness and sharpness of an electronic display, such as a liquid crystal display (LCD).

Embodiments of the present invention incorporate two key components: 1) a photoluminescence color panel (photoluminescence color-elements plate) having regions of photoluminescence material corresponding to each of the different color pixel areas of the display, and 2) a monochromatic or quasi-monochromatic short-wavelength excitation light source for exciting the photoluminescence material on the color panel. Additionally, a wavelength selective filter can be provided between the photoluminescence color panel and the excitation light source in order to prevent cross contamination of light among the different pixel areas of the display.

Figure 1:
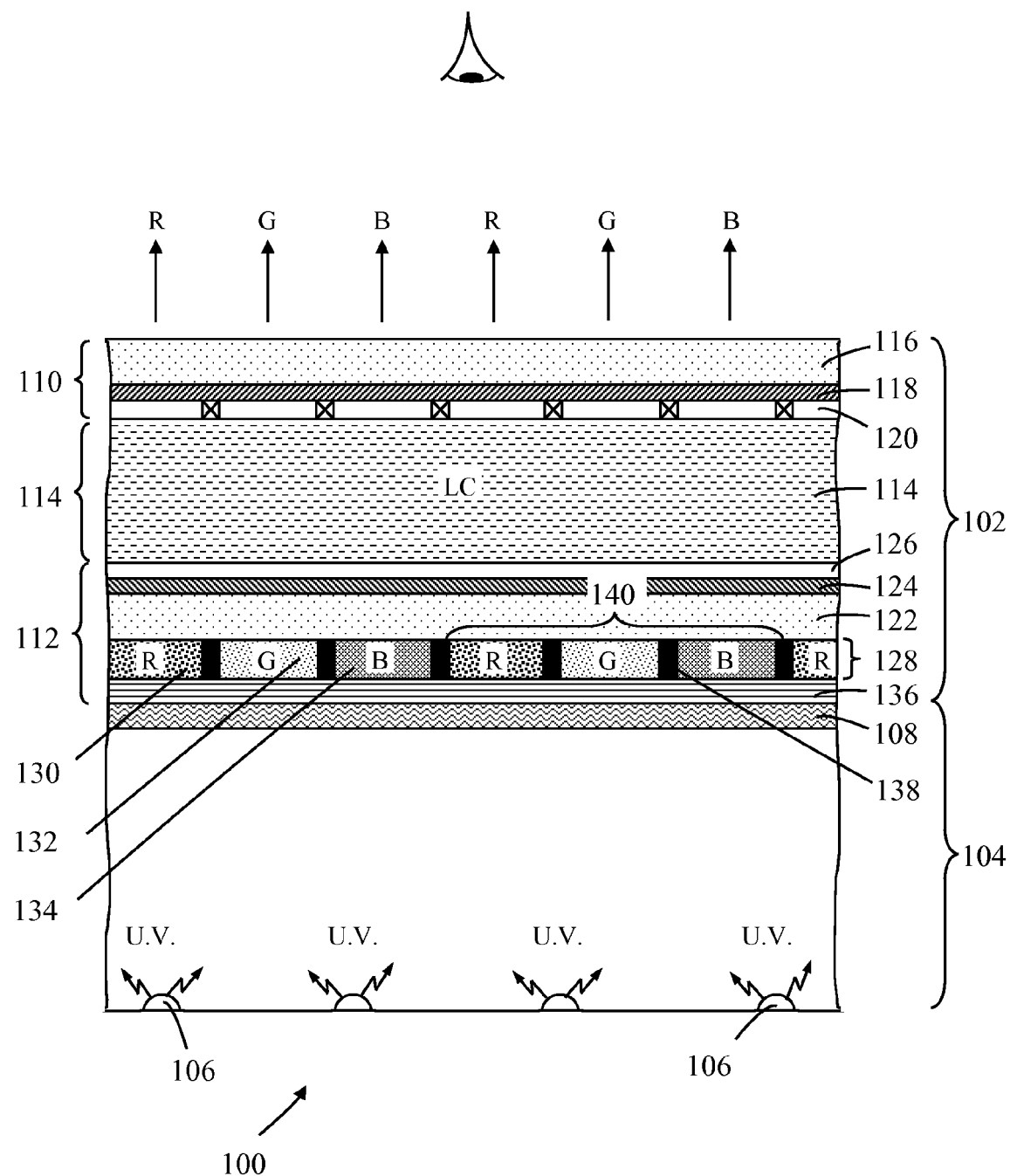
FIG. 1 is a schematic cross-sectional representation of a photoluminescence color LCD according to the invention.

Referring to FIG. 1 there is shown a schematic cross-sectional representation of a photoluminescence color LCD 100 according to a first embodiment of the invention. The LCD 100 comprises a display panel 102 and a backlighting unit 104.

The backlighting unit 104 comprises either a single excitation radiation source or a plurality of sources 106 and a light diffusing plane 108. Each radiation source 106 may be monochromatic or quasi-monochromatic, that is operable to emit excitation radiation of a narrow wavelength range/color. In the arrangement of FIG. 1 the, or each, excitation source 106 comprises a UV emitting LED (wavelength range 360 to 400 nm), a UV emitting lamp (254 nm), plasma discharge (147 to 190 nm) or light sources such as UV discharges of inert gas filled arc lamps. The light diffusing plane 108 ensures the display panel 104 is substantially evenly irradiated with excitation radiation over its entire surface.

The display panel 102 comprises a transparent (light transmissive) front (light/image emitting) plate 110, a transparent back plate 112 and a liquid crystal (LC) 114 filling the volume between the front and back plates. The front plate 110 comprises a glass plate 116 having on its underside, that is the face of the plate facing the LC 114, a first polarizing filter layer 118 and then a thin film transistor (TFT) layer 120. The back plate 112 comprises a glass plate 122 having a second polarizing filter layer 124 and a transparent common electrode plane 126 (for example transparent indium tin oxide, ITO) on its upper surface facing the LC and a photoluminescence color-elements plate 128 on its underside facing the backlighting unit 104. Additionally, the back plate 112 can further comprise a wavelength selective filter 136 located between the photoluminescence color-elements plate 128 and the backlighting unit 104. The function of the wavelength selective filter plate is described with reference to FIG. 7.

As will be described the photoluminescence color-elements plate 128 comprises an array of different photoluminescence color-elements (sub-pixels) 130, 132, 134 which emit red (R), green (G), and blue (B) light respectively in response to UV excitation radiation from the backlighting unit 104. The TFT layer 120 comprises an array of TFTs, wherein there is a transistor corresponding to each individual color photoluminescence sub-pixel 130, 132, 134 of each pixel unit 240 of the photoluminescence color-elements plate 128. Typically the directions of polarization of the two polarizing filters 118, 124 are aligned perpendicular to one another.

The RGB photoluminescence color-elements 130, 132, 134 function in such a manner that the result is similar to that which the color filters of prior art LCD devices achieve, each RGB pixel being capable of producing a range of colors. The difference between the prior art color filters and the presently disclosed RGB photoluminescence color-elements is that color filters only allow certain wavelengths of light to pass through them, whereas the photoluminescence material (phosphors and/or quantum dots) generate a selected wavelength (color) of light in response to excitation by UV radiation from the backlighting unit. Stated another way, color filters allow only light within a certain range of wavelengths to be transmitted, whereas the RGB phosphors and/or quantum dots emit light of different colors, with a certain spectral width centered at a peak wavelength.

Figure 2A:
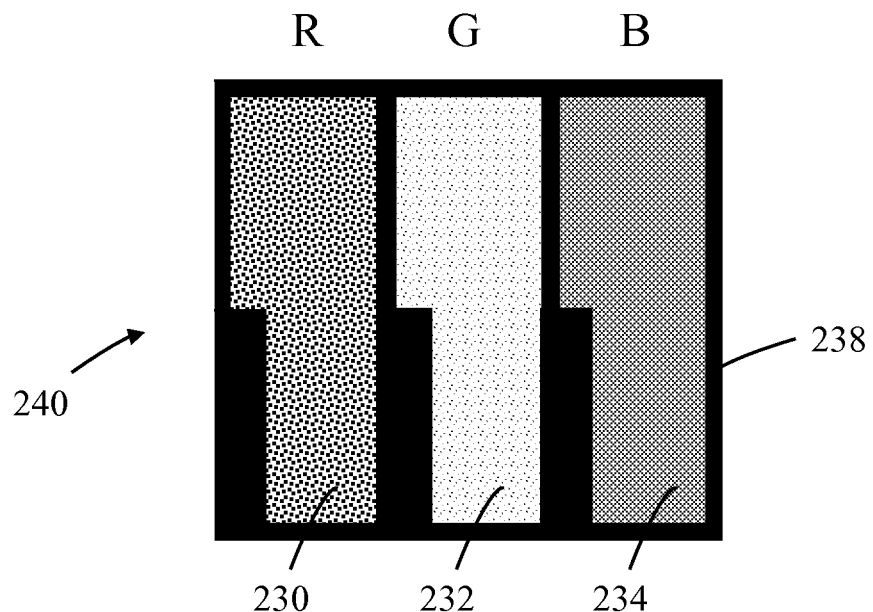
FIG. 2a is a schematic diagram of a unit pixel of a phosphor and/or quantum dots color-elements plate of the display of FIG. 1.

The RGB photoluminescence color-elements can be packaged/configured on the photoluminescence color-elements plate 128 in a manner similar to the way in which the color filters of the prior art displays are configured. This is illustrated in FIG. 2a which shows a RGB unit pixel 240 of the photoluminescence color-elements plate 228 comprising a sub-pixel triplet filled by three photoluminescence color-elements 230, 232, 234 with emissions centered at the primary red (R), green (G), and blue (B) colors for UV excited photoluminescence materials, such as phosphors and/or quantum dots. A grid mask (also termed a black matrix) 238 of metal, such as for example chromium, defines the photoluminescence color-elements (sub-pixels) 230, 232, 234 and provides an opaque gap between the photoluminescence sub-pixels and unit pixels. Additionally the black matrix shields the TFTs from stray light and prevents crosstalk between neighboring sub-pixels/unit pixels. To minimize reflection from the black matrix 238, a double layer of Cr and CrOx may be used, but of course, the layers may comprise materials other than Cr and CrOx. The black matrix film which can be sputter-deposited underlying or overlying the photoluminescence material may be patterned using methods that include photolithography.

Different types of photoluminescence materials, such as quantum dots, inorganic and organic phosphor materials, can be used for the photoluminescence sub-pixels of the display.

Quantum dots can comprise different materials, for example cadmium selenide (CdSe). The color of light generated by a quantum dot is enabled by the quantum confinement effect associated with the nano-crystal structure of the quantum dots. The RGB quantum dots can, compared with other photoluminescence materials, generate pure (narrow bandwidth) and saturated emission colors. The energy level of each quantum dot relates directly to the size of the quantum dot. For example, the larger quantum dots, such as red quantum dots, can absorb and emit photons having a relatively lower energy (i.e. a relatively longer wavelength). On the other hand, the green and blue quantum dots, which are smaller in size can absorb and emit photons of a relatively higher energy (shorter wavelength). Hence, the wavelength of the emitted light from the RGB quantum dots can be configured by careful selection of the size of the quantum dots. Additionally, photoluminescence color displays are envisioned that use cadmium free quantum dots and rare earth (RE) doped oxide colloidal phosphor nano-particles, in order to avoid the toxicity of the cadmium in the quantum dots. It is believed that the use of quantum dot materials as the sub-pixels of a photoluminescence color display is inventive in its right.

There are a variety of compositions available for the red (R), green (G), and blue (B) quantum dots of the RGB photoluminescence color-element plate 128. Examples of suitable quantum dots composition is given in Table 1.

TABLE 1

Chemical formula of example quantum dots compositions

| Quantum Dot | | |
|---|---|---|
| BLUE (450 nm-460 nm) | GREEN (530 nm-540 nm) | RED (610 nm-630 nm) |
| CdSe ~2 nm | CdSe ~2.9 nm | CdSe ~4.2 nm |
| $Cd_xZn_{1-x}Se$ | $Cd_xZn_{1-x}Se$ | $Cd_xZn_{1-x}Se$ |
| CdZnSeS | CdZnSeS | CdZnSeS |
| $CdSe_xS_{1-x}$ | $CdSe_xS_{1-x}$ | $CdSe_xS_{1-x}$ |
| CdTe | CdTe | CdTe |
| $CdTe_xS_{1-x}$ | $CdTe_xS_{1-x}$ | $CdTe_xS_{1-x}$ |
| CdS | CdS | — |
| $Cd_xZn_{1-x}S$ | — | — |
| InP | InP | InP |
| $In_xGa_{1-x}P$ | $In_xGa_{1-x}P$ | $In_xGa_{1-x}P$ |
| GaP | — | — |
| — | — | InAs |
| — | $CuInS_2$ | $CuInS_2$ |
| — | $CuInSe_2$ | $CuInSe_2$ |
| — | $CuInS_xSe_{2-x}$ | $CuInS_xSe_{2-x}$ |
| $Cu\,In_xGa_{1-x}S_2$ | $Cu\,In_xGa_{1-x}S_2$ | $Cu\,In_xGa_{1-x}S_2$ |
| $Cu\,In_xGa_{1-x}Se_2$ | $Cu\,In_xGa_{1-x}Se_2$ | $Cu\,In_xGa_{1-x}Se_2$ |
| $CuGaS_2$ | $CuGaS_2$ | $CuGaS_2$ |
| $Cu\,In_xAl_{1-x}Se_2$ | $Cu\,In_xAl_{1-x}Se_2$ | $Cu\,In_xAl_{1-x}Se_2$ |
| $Cu\,Ga_xAl_{1-x}Se_2$ | $Cu\,Ga_xAl_{1-x}Se_2$ | |
| $CuInS_{2x}ZnS_{1-x}$ | $CuInS_{2x}ZnS_{1-x}$ | $CuInS_{2x}ZnS_{1-x}$ |
| $CuInSe_{2x}ZnSe_{1-x}$ | $CuInSe_{2x}ZnSe_{1-x}$ | $CuInSe_{2x}ZnSe_{1-x}$ |

The quantum dots material can comprise core/shell nano-crystals containing different materials in an onion-like structure. For example, the above exemplary materials in Table 1 can be used as the core materials for the core/shell nano-crystals.

The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium.

In the case of the cadmiun-based quantum dots, e.g. CdSe quantum dots, the core/shell quantum dots can be synthesized using the formula of CdSe/ZnS, CdSe/CdS, CdSe/ZnSe, CdSe/CdS/ZnS, or CdSe/ZnSe/ZnS. Similarly, for $CuInS_2$ quantum dots, the core/shell nanocrystals can be synthesized using the formula of $CuInS_2$/ZnS, $CuInS_2$/CdS, $CuInS_2$/$CuGaS_2$, $CuInS_2$/$CuGaS_2$/ZnS and so on.

As well as quantum dots the photoluminescence materials of the for red, green and blue sub-pixels of the RGB photoluminescence color-element plate can comprise a variety of other photoluminescence materials including organic and inorganic phosphor materials. Examples of organic phosphors include organic dyes such as red light emitting dyes, yellow light emitting dyes, and green light emitting dyes. An example of a suitable red light emitting dye is ADS™-100RE (American Dye Source Inc., Canada). An example of a suitable green light emitting dye is ADS™-085GE (American Dye Source Inc., Canada).

In addition, organic dyes can be chosen from dyes used for tunable dye lasers that can be adequately excited with blue light. Useful light emitting dyes may include, but are not limited to, Lumogen™ F Red 300 (red emitter), Lumogen™ Red 300 Nanocolorant™ (red emitter), and Lumogen™ F Yellow 083 (yellow emitter) (BASF Aktiengesellschaft of Germany) and ADS™ 100RE (red emitter) (American Dye Source Inc., Canada). Useful green light emitting dyes may include, but are not limited to, ADS™ 085GE (American Dye Source Inc., Canada).

Also, there are a variety of compositions available for the red, green, and blue inorganic phosphors of the RGB phosphor color-element plate 128. The host material is typically an oxide, and may comprise an aluminate, silicate, phosphate or borate, but the host material is not restricted to these classes of compounds. The red, green, and blue phosphors, for example, can comprise an aluminate, a silicate, a sulfate, an oxide, a chloride, a fluoride, and/or a nitride, doped with a rare-earth element called an activator. The activator may include divalent europium or cerium, but the activator is not limited to these elements. Dopants such as halogens can be substitutionally or interstitially incorporated into the crystal lattice And can for example reside on oxygen lattice sites of the host material and/or interstitially within the host material. Examples of suitable phosphor composition along with the range of wavelengths at which they may be excited is given in Table 2.

TABLE 2

Chemical formula of example phosphor compositions

| Source | Excitation wavelength | Phosphor Composition | | |
|---|---|---|---|---|
| | | Blue | Green | Red |
| Blue LED | 400~480 nm | — | $(Sr,Ba,Mg)_2SiO_4$: Eu,F | $(Sr,Ba,Mg,Al)_3SiO_5$: Eu,F |
| UV LED | 360~400 nm | $BaMgAl_{10}O_{17}$: Eu $(Sr,Ca,Ba,Mg)_{10}(PO_4)_6Cl_2$: Eu $(Ba,Sr,Eu)(Mg,Mn)Al_{10}O_{17}$ $Sr_{10}(PO_4)_6Cl_2$: Eu $(Ba,Eu)MgAl_{10}O_{17}$ | $(Sr,Ba,Mg)_2SiO_4$: Eu,F $(Ba,Eu)(Mg,Mn)Al_{10}O_{17}$ | $(Sr,Ba,Mg,Al)_3SiO_5$: Eu,F $Ca_2NaMg_2V_3O_{12}$: $Eu^{3+}$ $YVO_4$: Eu |
| UV | 254 nm | $(SrCaBaMg)_5(PO_4)_3Cl$: Eu $(Ba,Eu)$ $Mg_2Al_{16}O_{27}$ $(Ba,Sr,Eu)(Mg,Mn)Al_{10}O_{17}$ $Sr_{10}(PO_4)_6Cl_2$: Eu $(Ba,Eu)MgAl_{10}O_{17}$ | $LaPO_4$: Ce,Tb (Ce,Tb) $MgAl_{11}O_{19}$ $(Ba,Eu)(Mg,Mn)Al_{10}O_{17}$ | $Y_2O_3$: Eu $YVO_4$: Eu |
| PDP | 147~190 nm | $BaMgAl_{10}O_{17}$: Eu | $Zn_2SiO_4$: Mn | $(Y,Gd)BO_3$: Eu |

There are a variety of ways in which the RGB photoluminescence materials can be incorporated into/onto the photoluminescence color-elements plate glass plate 128.

For example the RGB quantum dots can be deposited directly on a substrate using a printing process. The printing process can form a thin layer of quantum dots without using a solvent. Thus, a printing process can be simple and efficient with high throughput.

Most inorganic phosphor materials are hard substances, and the individual particles may have a variety of irregular shapes. It can be difficult to incorporate them directly into a plastics resin, however, phosphors are known to be compatible with acrylic resins, polyesters, epoxies, polymers such as polypropylene and high and low density polyethylene (HDPE, LDPE) polymers. Materials may be cast, dipped, coated, extruded or molded. In some embodiments it may be preferable to use master batches for incorporating the phosphor-containing materials into clear plastics, which may then be coated onto the glass plate 122 of the photoluminescence color-element plate 128. In reality, any of the methods that are used for fabricating plasma display panels having RGB phosphor-containing pixel matrices, such methods being screen printing, photolithography, and ink printing techniques, may also be used to fabricate the present photoluminescence color-elements plate 128.

An advantage of the LCD of the present invention is the prolonged life of the LC since the photoluminescence color-element plate is provided on the backlighting unit side of the LC this prevents UV activation light reaching the LC and causing degradation. Placing the excitation light source next to the photoluminescence color-elements plate can enhance the quantum efficiency of the display panel if the UV absorption of the liquid crystal material severely attenuates the excitation intensity.

Figure 2B:
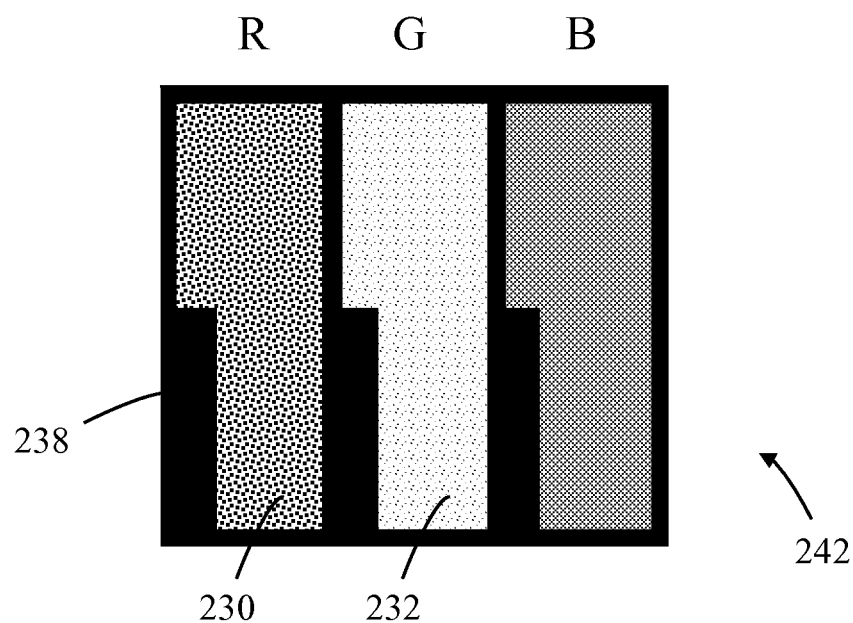
FIG. 2b is a schematic diagram of a unit pixel of a phosphor and/or quantum dots color-elements plate of the display of FIG. 1.
Figure 3:
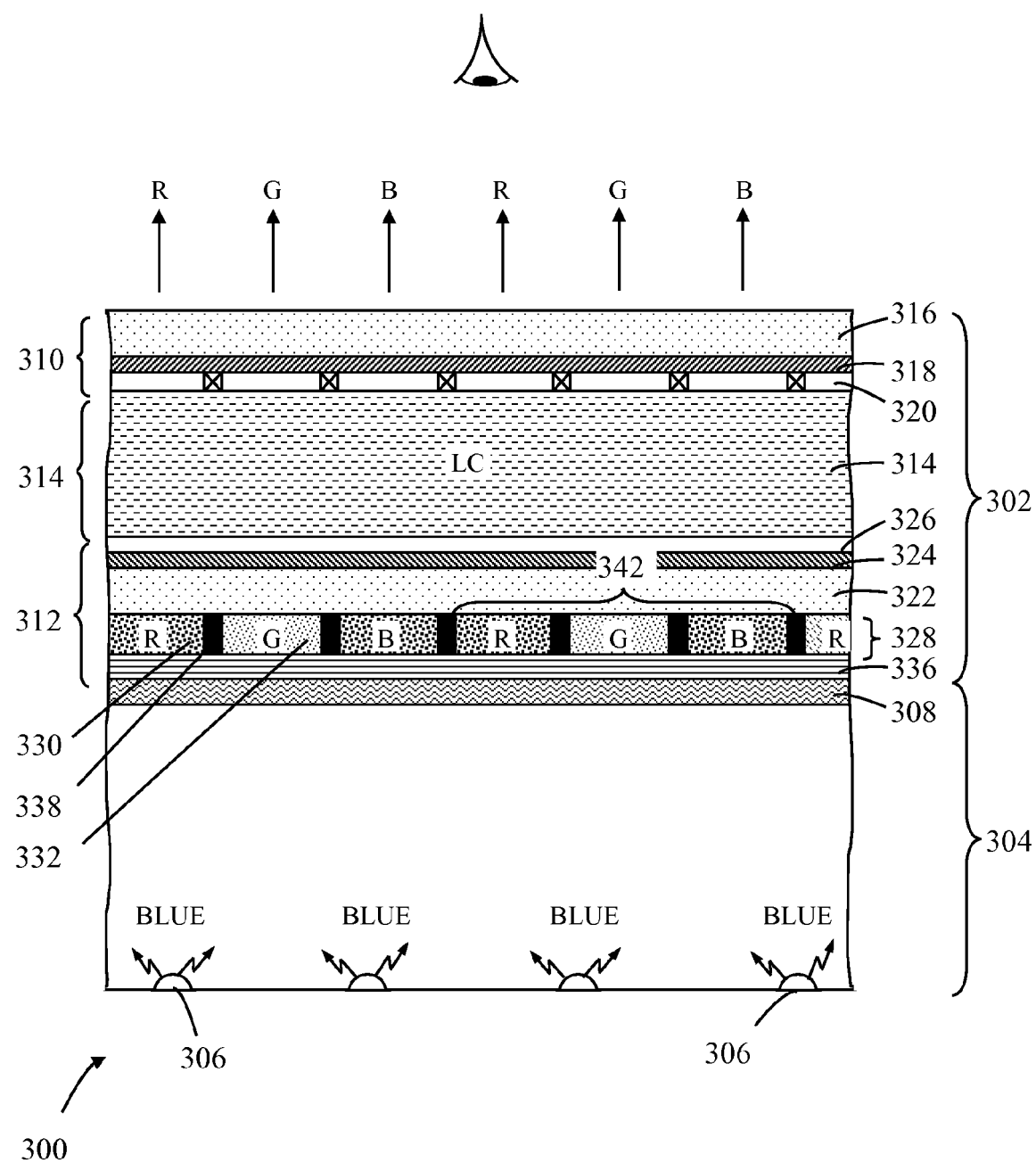
FIG. 3 is a schematic cross-sectional representation of an alternative embodiment of the configuration shown in FIG. 1.

FIG. 3 illustrates an alternative photoluminescence color display 300 in accordance with the invention which uses blue light (400 nm to 480 nm) activated photoluminescence materials. Throughout this specification like reference numerals preceded by the figure number are used to denote like parts. For example the LC 114 of FIG. 1 is denoted 314 in FIG. 3. In contrast to the display 100 of FIG. 1 the backlighting unit 304 incorporates blue light emitting diodes (LEDs) 306 for exciting red and green photoluminescence sub-pixels 330, 332 respectively. FIG. 2b is a unit pixel 242 of the photoluminescence color-elements plate 328. The unit pixel 242 includes two blue light excitable photoluminescence material sub-pixels (phosphors and/or quantum dots) 230, 232 that emit red (R) and green (G) light respectively, and a third sub-pixel that is left empty (that is without the inclusion of a photoluminescence material) to allow the transmission of blue light from a blue emitting LED backlighting unit 304. In this case, the monochromatic or quasi-monochromatic backlighting unit 304 serves a dual purpose; firstly it generates blue excitation radiation to excite the red and green photoluminescence materials, and second, it provides the blue portion of the backlighting light. Additionally, the back plate 312 can further comprise a wavelength selective filter plate 336 positioned between the photoluminescence color-elements plate 328 and the backlighting unit 304.

Figure 4A:
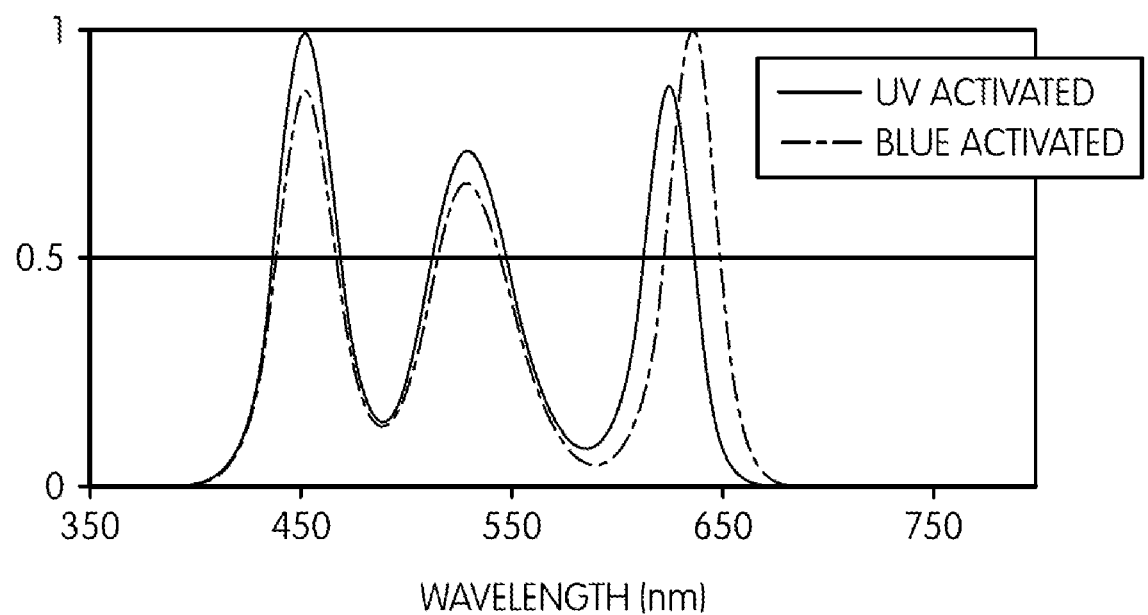
FIG. 4a shows schematic normalized emission spectra for red, green, and blue light generated by UV and blue light excited phosphors.
Figure 4B:
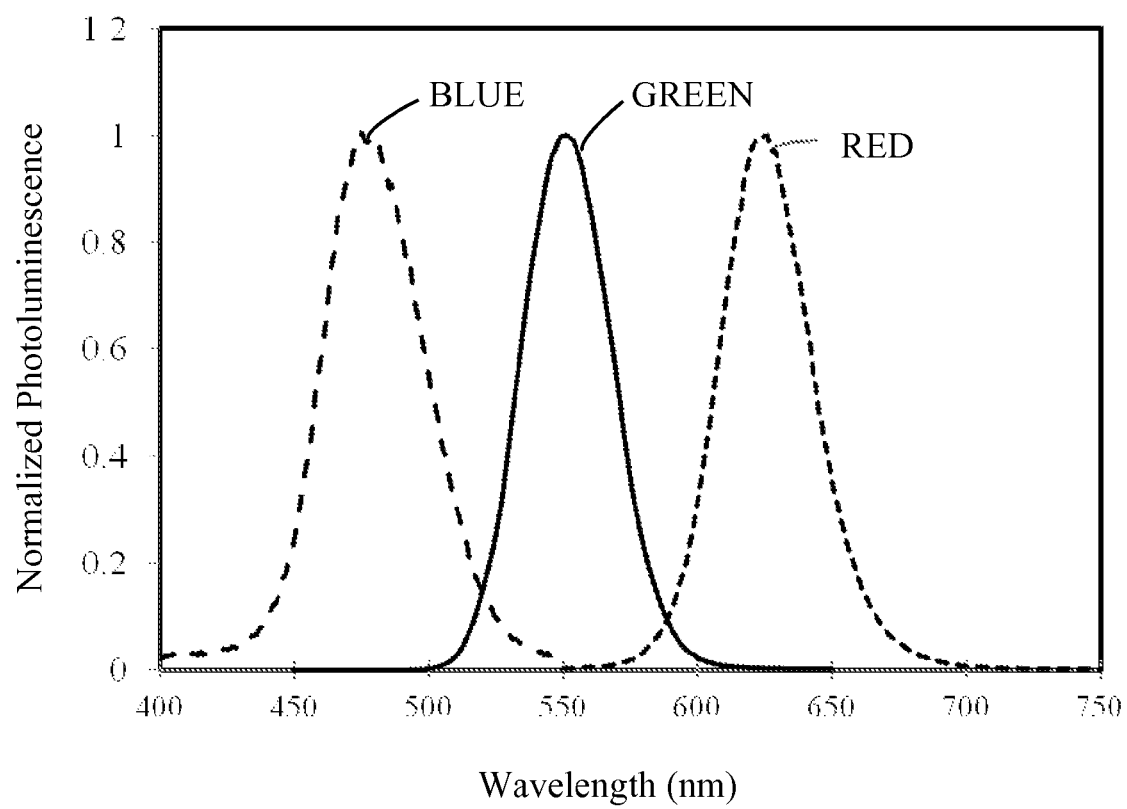
FIG. 4b shows schematic normalized emission spectra for red, green, and blue light generated by quantum dots materials.

Exemplary emission spectra for red, green, and blue inorganic phosphors are shown schematically in FIG. 4a. Additionally, exemplary emission spectra for red, green, and blue quantum dots materials are shown schematically in FIG. 4b. It is to be noted that the emission peaks for quantum dots have a much narrower spectral width which is preferred for display purposes. Exemplary monochromatic and/or quasi-monochromatic light sources (backlighting units) 104, 304 that would lead to such emission are ultraviolet (UV) light emitting diodes (LEDs), and single or multiple sharp line emissions from UV lamps such as, but not limited to, the 256 nm line from a mercury lamp.

Figure 5:
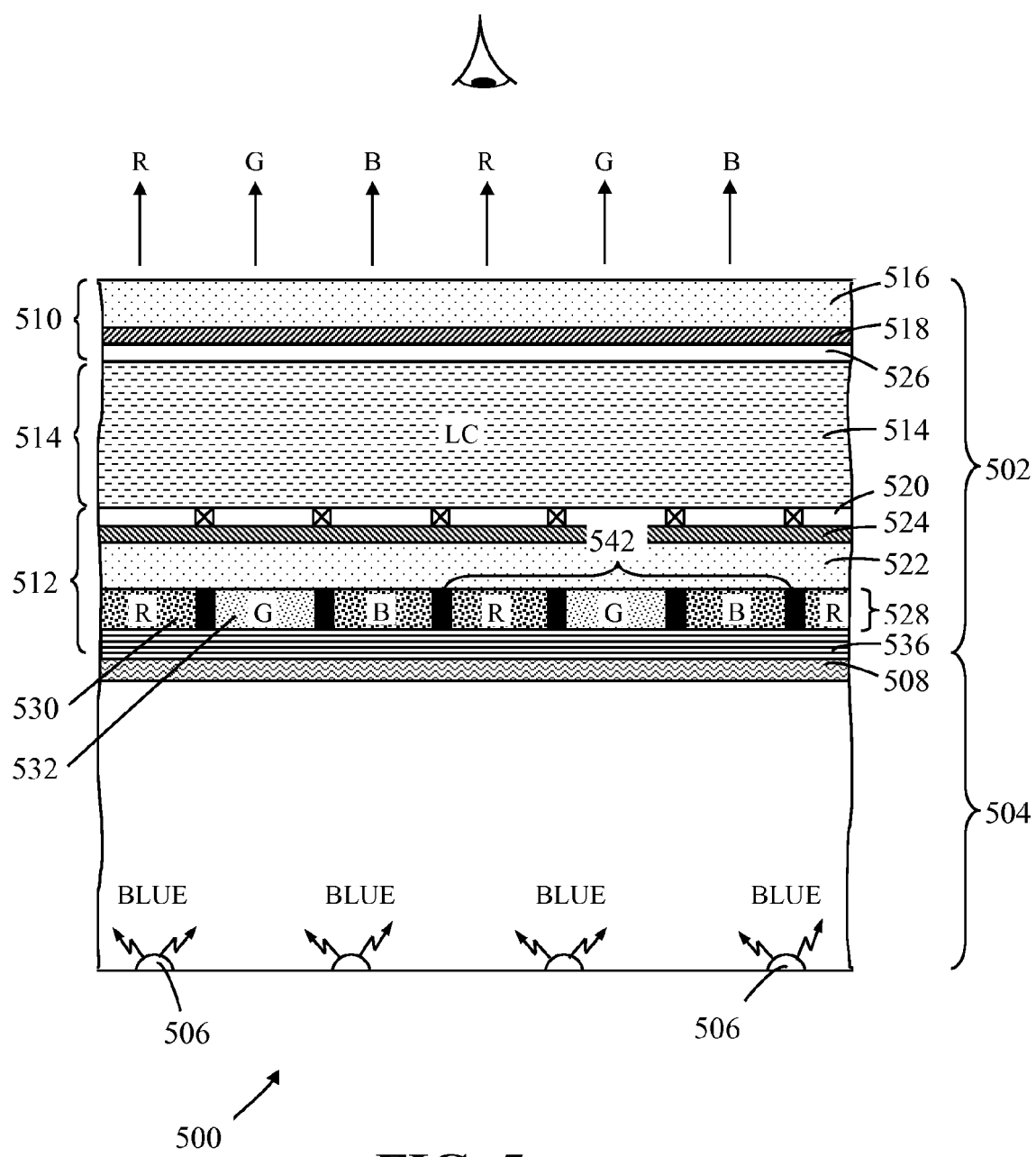
FIG. 5 is a schematic cross-sectional representation of a further photoluminescence color LCD in accordance with the invention which is backlit by blue light.

In a further embodiment, as illustrated in FIG. 5, the back plate 512 includes both the TFT plate 520 and photoluminescence color-elements plate 528. In this arrangement the TFT plate 520 can be provided on the second polarizing filter 524 on the upper surface of the glass plate 522 facing the LC, and the photoluminescence color-elements plate 528 is provided on the opposite lower face of the glass plate. In the embodiment illustrated the backlighting unit 504 comprises a blue light excitation source and can comprise one or more blue emitting LEDs 506. As with the embodiment of FIG. 3 only red 530 and green 532 photoluminescence material sub-pixels are incorporated in the photoluminescence color-element plate 528, the blue excitation light also serving as the third of the three primaries that are essential to color rendering. Additionally, the back plate 512 can further comprise a wavelength selective filter plate 536 positioned between the photoluminescence color-elements plate 528 and the backlighting unit 504.

Figure 6:
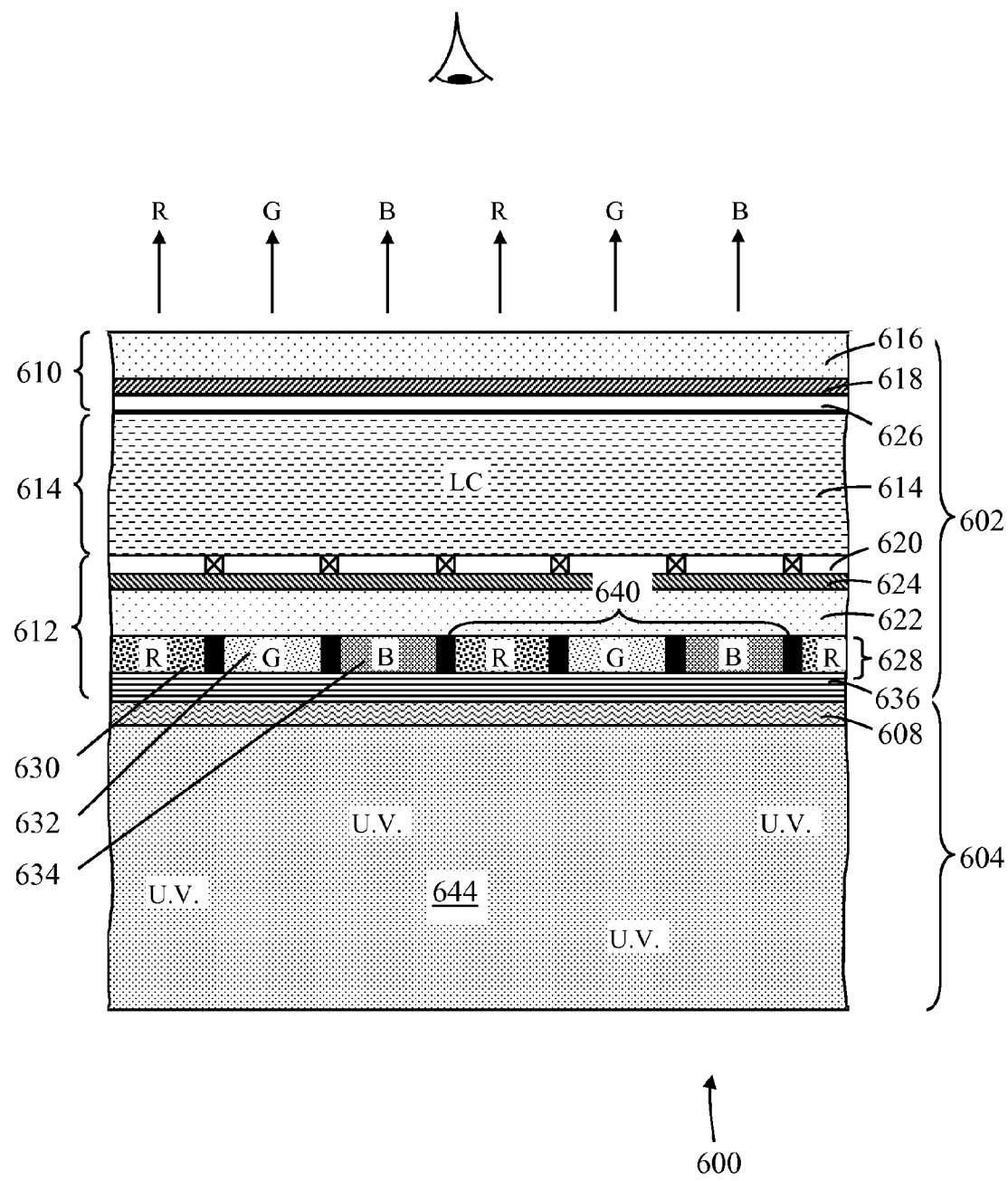
FIG. 6 is a schematic cross-sectional representation of another photoluminescence color LCD in accordance with the invention which is backlit by a UV plasma discharge.

FIG. 6 illustrates a photoluminescence color display 600 in accordance with a further embodiment of the invention. In FIG. 6, UV excitation irradiation is generated by a plasma discharge 644 of a gas such as Hg (Mercury), Xe (Xenon), or Ne (Neon), and the plasma used to excite the RGB photoluminescence material sub-pixels 630, 632, and 634 in a similar fashion to the way in which photoluminescence emission takes place in a plasma display panel (PDP). However, the difference between the embodiment illustrated in FIG. 6 and a PDP is that in the present embodiment there is only a single plasma source providing a collective excitation to all photoluminescence color pixels 640. This is in contrast to plasma display technology, in which there are provided the same numbers of plasma sources as there are photoluminescence pixels, and where each individual photoluminescence pixel is excited by its own plasma source.

In further embodiments, not illustrated, the photoluminescence color-elements plate can be provided as part of the front plate that is an on opposite side of the liquid crystal to the backlighting unit. In such an arrangement the TFTs plate can be provided on the front or back plates.

Photoluminescence color displays in accordance with invention are expected to produce a spectacular, vivid range of colors rivaling plasma display panel (PDP) technology. It is known that color filters are a key component in LCDs for sharpening color, although they account for as much as 20 percent of the manufacturing cost. Significant cost reduction is expected with the present embodiments, particularly when an array of blue LEDs is used to provide backlighting, because only two thirds of the sub-pixels need to be coated with a photoluminescence material (phosphor and/or quantum dots).

In addition, LEDs are the preferred choices as backlighting excitation sources because they are expected to have longer lifetimes than other light sources. LEDs are more durable because there is no filament to burn out, no fragile glass tube to shatter, no moving parts to protect, and a cooler operating temperature. In fact, the lifespan of a LED is estimated to be twice as long as the best fluorescent bulbs. By adjusting the number and density of the LEDs, high brightness values can be achieved without significantly diminishing the life expectancy of the liquid crystal displays. Moreover, LEDs are more efficient with lower power consumption.

The demand for more efficient backlighting has been steadily increasing. The current LCD technology that employs color filters has only about a 10 to 20 percent efficiency of light output that is achievable at the front of a liquid crystal display. By contrast, the present embodiments using a photoluminescence-based color rendering scheme, including using red-green photoluminescence elements plus blue LED illumination, can have up to 90 percent efficiency of light output. Moreover, television sets having liquid crystal displays with phosphor pixels might also provide very wide horizontal and vertical viewing angles.

Figure 7:
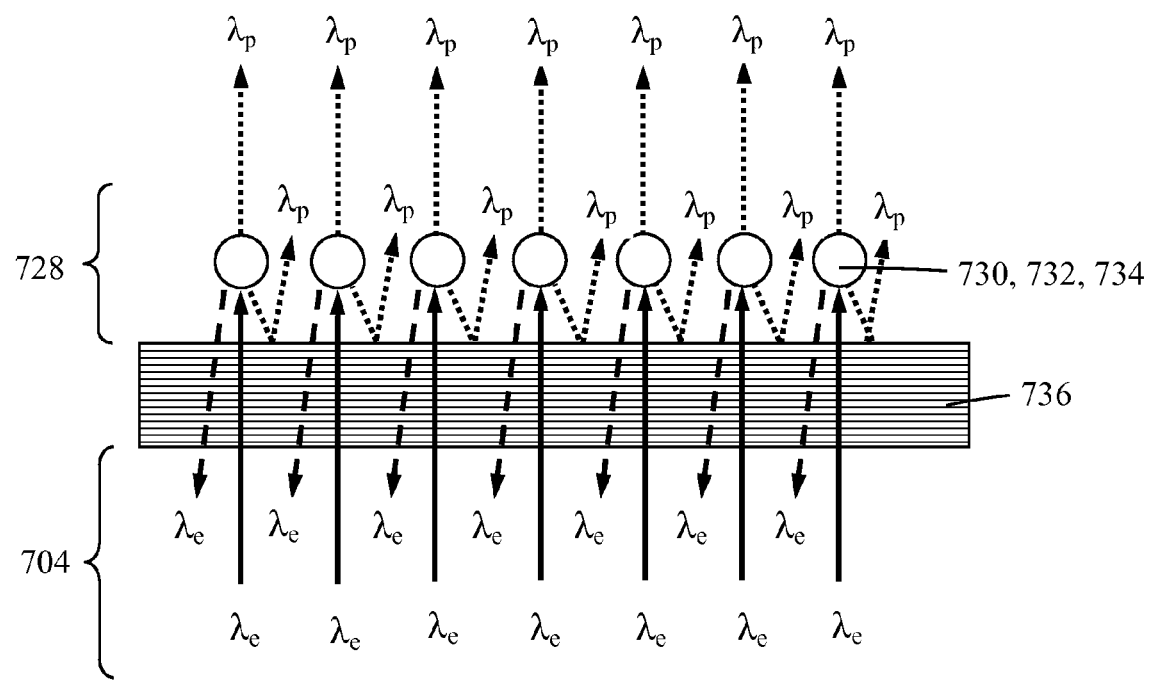
FIG. 7 is a schematic diagram of a wavelength selective filter of the display.

FIG. 7 is a schematic diagram of a wavelength selective filter 736 that can be utilized in various photoluminescence color displays in accordance with the invention. Since the photoluminescence process is isotropic, photoluminescence generated light is emitted in all directions including those back towards the backlight unit. Since the backlight unit is common to all pixels of the display, once such light enters the backlight unit it could then be emitted from pixels of a different color. For example green light generated by a green sub-pixel could be emitted from a red or a blue sub-pixel and such emission would degrade the displays performance. The wavelength selective filter 736 is configured to prevent such light from being emitted from pixel areas of different colors.

The wavelength selective filter 736 is configured to allow the transmission of the excitation radiation from the excitation source to excite the photoluminescence material whilst substantially preventing (e.g. reflecting) the passage of light generated by the photoluminescence material. Such a filter can ensure that only light of a correct color is emitted from the correct pixel area.

As shown in FIG. 7, the wavelength selective filter 736 can be positioned between the photoluminescence color-elements plate 728 and the backlight unit 704. The wavelength selective filter 736 is configured to:

i) allow excitation light of wavelength $\lambda_e$ generated by the backlight unit to pass through substantially unattenuated and to excite the photoluminescence materials on the photoluminescence color-elements plate 728 which in response generate light of a different (longer, in general) wavelength $\lambda_p$;

ii) allow unconverted excitation light scattered or otherwise reflected by the photoluminescence material to pass back to the backlight unit (such light can then be utilized by other pixels); and iii) prevent photoluminescence generated light from passing to the backlight unit.

Figure 8:
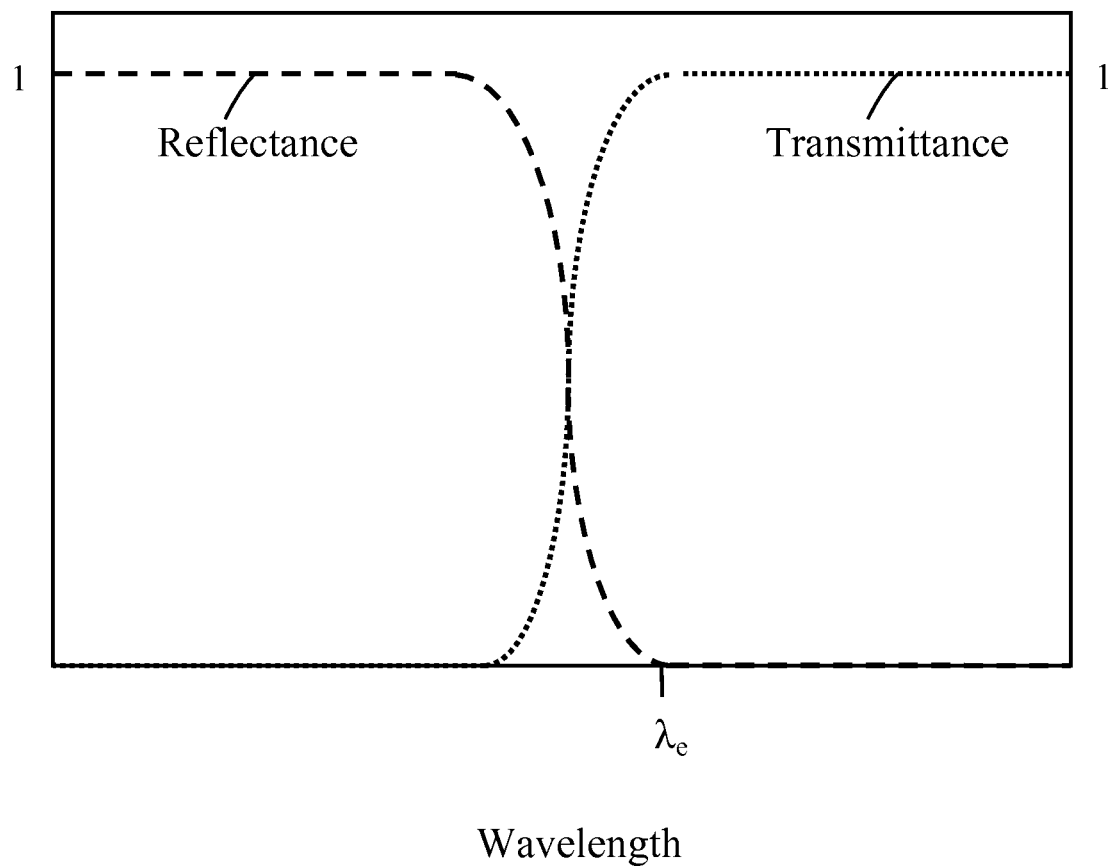
FIG. 8 shows schematic normalized transmittance and reflectance properties of the wavelength selective filter of FIG. 7.

Exemplary transmittance and reflectance characteristics of the wavelength selective filter 736 are shown schematically in FIG. 8. As shown in FIG. 8, the filter has a transmittance that remains at an almost constant maximum up to a critical wavelength, $\lambda_c$. Then, the transmittance of the incoming light drops to minimum. Conversely, the filter has a reflectance that is at a minimum up to the critical wavelength $\lambda_c$. It is preferable to configure the wavelength selective filter 736 to have a critical wavelength, $\lambda_c$, which is longer than the wavelength of the backlight $\lambda_e$, in order to maximize transmittance of excitation light. At the same time, it is also preferable to configure the wavelength selective filter 736 to have a critical wavelength, $\lambda_c$, which is shorter than the wavelength of the emitted light generated by the photoluminescence materials $\lambda_p$, in order to maximize reflecting photoluminescence generated light. The wavelength selective filter can comprise a dichroic filter such a multi-layered dielectric stack.

Figure 9:
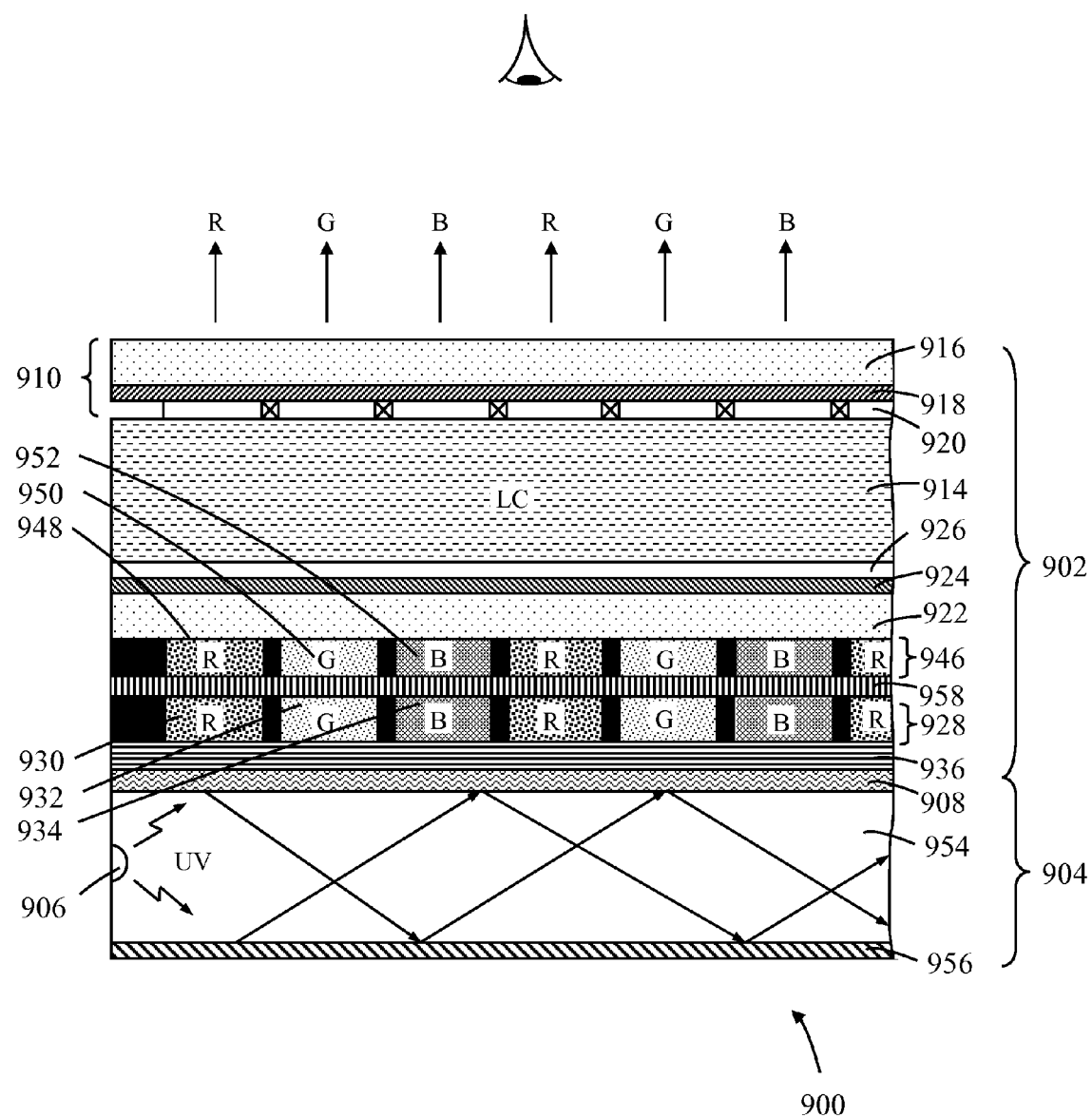
FIG. 9 is a schematic cross-sectional representation of a further photoluminescence color LCD with color filter in accordance with the invention which is backlit by UV light.

In a further embodiment, as illustrated in FIG. 9, the back plate 912 includes a color filter plate 946 in addition to the photoluminescence color-elements plate 928. The color filter plate 946 includes an array of red 948, green 950 and blue 952 color filter elements in which each filter elements corresponds to a respective color sub-pixel in the display. For example, a red color filter element 948 can be positioned overlaying a red photoluminescence color-element in the color-element plate for displaying a red sub-pixel. The function of the color filter plate 946 is to prevent unconverted excitation radiation being emitted from pixel areas containing a photoluminescence material. Such a color filter plate can be beneficial for photoluminescence displays that utilize quantum dots materials since it can be difficult to guarantee 100% conversion of excitation light to photoluminescence light. The color filter plate can comprise the color filter plate of a known display that uses a white backlight. Typically the various filter areas comprise a band pass filter with a pass band corresponding to the color of light emitted by each pixel area. Such filters not only prevent the transmission of unconverted excitation radiation but additionally can be used to narrow and/or fine tune the emission color of the pixel areas to optimize the displays performance.

In the embodiment illustrated the backlighting unit 904 comprises a planar light guide (waveguide) 954 with one or more UV excitation sources 906 located along one or more edges of the light guide 954. In operation excitation light is coupled into the edge(s) of the light guide and is guided, by total internal reflection, over the entire volume of the light guide to give a uniform illumination over the entire surface of the display panel. As shown and to prevent the escape of light from the backlight unit the rear of the light guide can further comprise a light reflective surface 956.

The photoluminescence material elements in the photoluminescence color-elements plate 928 can absorb the excitation UV light and emits a light in a color correspondent to the display. The color filter can improve the display by filtering out light in different colors, such as the backlight and/or incident light from other color elements.

Additionally, the back plate 912 can further comprise a wavelength selective filter 936 positioned between the photoluminescence color-elements plate 928 and the backlighting unit 904, and a Hoffman filter 958 that can guide the emitted light from photoluminescence color-element toward the color filter.

Figure 10:
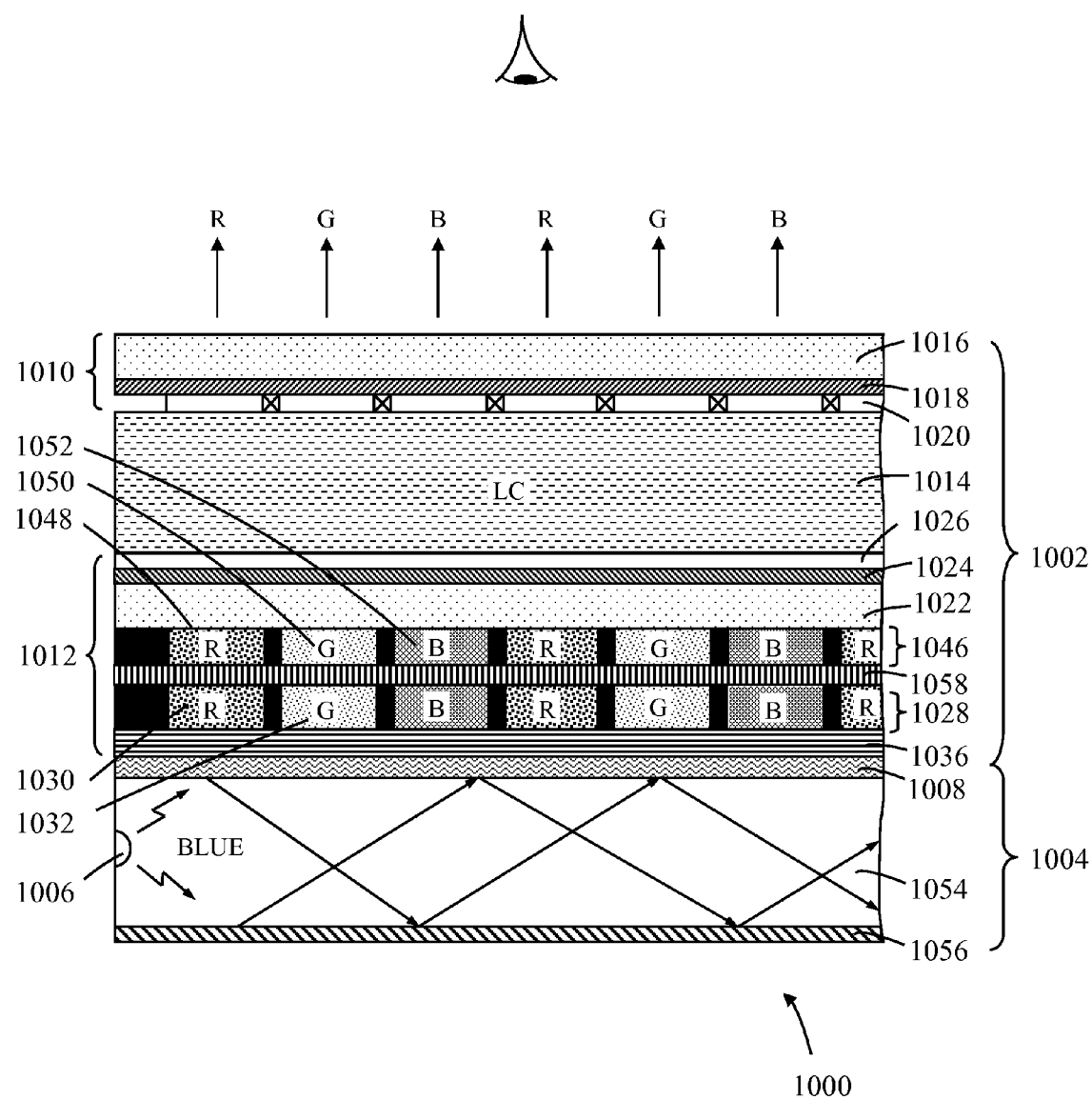
FIG. 10 is a schematic cross-sectional representation of a further photoluminescence color LCD with color filter plate in accordance with the invention which is backlit by blue light.

In a further embodiment, as illustrated in FIG. 10, the back plate 1012 includes a color filter plate 1046 in addition to the TFT plate 1020 and photoluminescence color-element plate 1028. The color filter plate 1046 includes an array of color filter elements that correspond to the color of a sub-pixel in the display. For example, a red color filter element can be provided overlaying red phosphor elements or a red quantum dot elements for displaying a red sub-pixel.

In the embodiment illustrated the backlight unit 1004 comprises one or more blue excitation light sources 1006 located along one or more edges of the light guide 1054. The phosphors element and/or quantum dot element in the photoluminescence color-elements plate 1028 can absorb the excitation blue light and emits a light in a color correspondent to the display.

In contrast to the embodiment of FIG. 9, only red 1030 and green 1032 photoluminescence material sub-pixels are incorporated in the photoluminescence color-elements plate 1028 and the blue excitation light also serves as the third of the three primaries that are essential to color rendering.

Additionally, the back plate 1012 can further comprise a wavelength selective filter 1036 positioned between the photoluminescence color-elements plate 1028 and the backlighting unit 1002, and a Hoffman filter 1054 that can guide the emitted light from photoluminescence color-element plate towards the color filter plate.

It will be appreciated that the present invention is not restricted to the specific embodiments described and that variations can be made that are within the scope of the invention. For example whilst for ease of fabrication the photoluminescence color-elements plate can be fabricated on a lower side of the back plate, in other arrangements it can be provided on the upper surface of the back plate and the first polarizing filter provided on top of the photoluminescence color-element plate.

What is claimed is:

1. A photoluminescence color display comprising:
   a display panel comprising a plurality of red, green and blue pixel areas;
   an excitation source operable to generate excitation radiation for operating the display;
   a photoluminescence color-elements plate comprising at least one of: red quantum dots material corresponding to red pixel areas that is operable to emit red light in response to said excitation radiation; green quantum dots material corresponding to green pixel areas that is operable to generate green light in response to said excitation radiation; and blue quantum dots material corresponding to blue pixel areas that is operable to emit blue light in response to said excitation radiation; and
   a wavelength selective filter disposed between the color-elements plate and the excitation source, the wavelength selective filter having a characteristic that allows the passage of excitation radiation and substantially prevents the passage of light generated by the photoluminescence materials of the photoluminescence color-elements plate.

2. The photoluminescence color display of claim 1, wherein the wavelength selective filter is substantially reflective to light generated by the photoluminescence materials.

3. The photoluminescence color display of claim 1, wherein the wavelength selective filter is configured to have a critical wavelength that is longer than the wavelength of the excitation radiation but shorter than the wavelength of light generated by said photoluminescence materials.

4. The photoluminescence color display of claim 1, wherein the wavelength selective filter comprises a dichroic filter.

5. The photoluminescence color display of claim 1, and further comprising a color filter plate located on a side of the display panel that is distal to the excitation source, wherein the color filter plate comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light.

6. The photoluminescence color display of claim 1,
wherein the photoluminescence color-elements plate is disposed between the excitation source and a liquid crystal of the display panel, and
wherein said quantum dots materials comprise nano-crystals having a core and multiple shells containing different materials in an onion-like structure.

7. The photoluminescence color display of claim 6, wherein said quantum dots materials comprise cadmium free quantum dots.

8. The photoluminescence color display of claim 6, wherein said quantum dots materials comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}S$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S2$); copper indium gallium selenide($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CuInSe_{2x}ZnSe_{1-x}$).

9. The photoluminescence color display of claim 6, wherein said quantum dots materials are deposited as a thin layer of quantum dots directly on a substrate using a contact printing process.

10. The photoluminescence color display of claim 6, wherein the wavelength selective filter is substantially reflective to light generated by the photoluminescence materials.

11. The photoluminescence color display of claim 6, wherein the wavelength selective filter is configured to have a critical wavelength that is longer than the wavelength of the excitation radiation but shorter than the wavelength of light generated by said photoluminescence materials.

12. The photoluminescence color display of claim 6, wherein the wavelength selective filter comprises a dichroic filter.

13. The photoluminescence color display of claim 6, and further comprising a color filter plate located on a side of the display panel that is distal to the excitation source, wherein the color filter plate comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light.

14. The photoluminescence color display of claim 1, wherein said quantum dots materials comprise cadmium free quantum dots.

15. The photoluminescence color display of claim 1, wherein said quantum dots materials comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}S$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S2$); copper indium gallium selenide($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CuInSe_{2x}ZnSe_{1-x}$).

16. The photoluminescence color display of claim 1, wherein said quantum dots materials comprise core/shell nano-crystals containing different materials in an onion-like structure.

17. The photoluminescence color display of claim 1, wherein said quantum dots materials are deposited as a thin layer of quantum dots directly on a substrate using a contact printing process.

18. A photoluminescence color display comprising:
a display panel comprising a plurality of red, green and blue pixel areas;
an excitation source operable to generate excitation radiation for operating the display;
a photoluminescence color-elements plate comprising at least one of: red organic dye and red quantum dot materials corresponding to red pixel areas of the display that are operable to generate red light in response to said excitation radiation; green organic dye and green quantum dot materials corresponding to the green pixel areas of the display that are operable to generate green light in response to said excitation radiation; and blue organic dye and blue quantum dot materials corresponding to blue pixel areas of the display that are operable to generate blue light in response to said excitation radiation; and
a wavelength selective filter disposed between the color-elements plate and the excitation source, the wavelength selective filter having a characteristic that allows the passage of excitation radiation and substantially prevents the passage of light generated by the photoluminescence materials of the photoluminescence color-elements plate.

19. The photoluminescence color display of claim 18, wherein the wavelength selective filter is substantially reflective to light generated by the photoluminescence materials.

20. The photoluminescence color display of claim 18, wherein the wavelength selective filter is configured to have a critical wavelength that is longer than the wavelength of the excitation radiation but shorter than the wavelength of light generated by said photoluminescence materials.

21. The photoluminescence color display of claim 18, wherein the wavelength selective filter comprises a dichroic filter.

22. The photoluminescence color display of claim 18, and further comprising a color filter plate located on a side of the display panel that is distal to the excitation source, wherein the color filter plate comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light.

23. The photoluminescence color display of claim 18, wherein the photoluminescence color-elements plate is disposed between the excitation source and a liquid crystal of the display panel.

24. The photoluminescence color display of claim 23, wherein the excitation source is operable to generate blue excitation light.

25. The photoluminescence color display of claim 23, wherein the wavelength selective filter is substantially reflective to light generated by the photoluminescence materials.

26. The photoluminescence color display of claim 23, wherein the wavelength selective filter is configured to have a critical wavelength that is longer than the wavelength of the excitation radiation but shorter than the wavelength of light generated by said photoluminescence materials.

27. The photoluminescence color display of claim 23, wherein the wavelength selective filter comprises a dichroic filter.

28. The photoluminescence color display of claim 23, and further comprising a color filter plate located on a side of the display panel that is distal to the excitation source, wherein the color filter plate comprises at least one of: first filter areas corresponding to red pixel areas of the display that are operable to allow the passage of red light; second filter areas corresponding to green pixel areas of the display that are operable to allow the passage of green light; and third filter areas corresponding to blue pixel areas of the display that are operable to allow the passage of blue light.

29. The photoluminescence color display of claim 23, wherein said quantum dots materials comprise cadmium free quantum dots.

30. The photoluminescence color display of claim 23, wherein said quantum dots materials comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}S$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S2$); copper indium gallium selenide($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CuInSe_{2x}ZnSe_{1-x}$).

31. The photoluminescence color display of claim 23, wherein said quantum dots materials comprise core/shell nano-crystals containing different materials in an onion-like structure.

32. The photoluminescence color display of claim 23, wherein said quantum dots materials are deposited as a thin layer of quantum dots directly on a substrate using a contact printing process.

33. The photoluminescence color display of claim 18, wherein said quantum dots materials comprise cadmium free quantum dots.

34. The photoluminescence color display of claim 18, wherein said quantum dots materials comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}S$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S2$); copper indium gallium selenide($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CuInSe_{2x}ZnSe_{1-x}$).

35. The photoluminescence color display of claim 18, wherein said quantum dots materials comprise core/shell nano-crystals containing different materials in an onion-like structure.

36. The photoluminescence color display of claim 18, wherein said quantum dots materials are deposited as a thin layer of quantum dots directly on a substrate using a contact printing process.

* * * * *